United States Patent
Wang et al.

(10) Patent No.: US 11,065,583 B2
(45) Date of Patent: Jul. 20, 2021

(54) SEPARATION MEMBRANES

(71) Applicant: Imperial College Innovations Limited, London (GB)

(72) Inventors: Bo Wang, London (GB); Jing Ji, London (GB); Kang Li, London (GB)

(73) Assignee: IMPERIAL COLLEGE INNOVATIONS LIMITED, London (GB)

( * ) Notice: Subject to any disclaimer, the term of this patent is extended or adjusted under 35 U.S.C. 154(b) by 0 days.

(21) Appl. No.: 16/094,983

(22) PCT Filed: Apr. 19, 2017

(86) PCT No.: PCT/GB2017/051089
§ 371 (c)(1),
(2) Date: Oct. 19, 2018

(87) PCT Pub. No.: WO2017/182801
PCT Pub. Date: Oct. 26, 2017

(65) Prior Publication Data
US 2019/0126208 A1 May 2, 2019

(30) Foreign Application Priority Data
Apr. 21, 2016 (GB) .................................. 1606988.2

(51) Int. Cl.
*B01D 67/00* (2006.01)
*B01D 61/14* (2006.01)
*B01D 71/34* (2006.01)

(52) U.S. Cl.
CPC ......... *B01D 67/0013* (2013.01); *B01D 61/14* (2013.01); *B01D 67/0011* (2013.01);
(Continued)

(58) Field of Classification Search
None
See application file for complete search history.

(56) References Cited

U.S. PATENT DOCUMENTS

| 4,567,009 A | 1/1986 | Badenhop et al. |
| 4,659,470 A | 4/1987 | Caneba et al. |
| (Continued) |

FOREIGN PATENT DOCUMENTS

| CN | 101780378 A | 7/2010 |
| CN | 102755841 A | 10/2012 |
| (Continued) |

OTHER PUBLICATIONS

Ji et al., PVDF/palygorskite composite ultrafiltration membranes with enhanced abrasion resistance and flux. Journal of Membrane Science. 2015;495:91-100.

*Primary Examiner* — Vishal V Vasisth
(74) *Attorney, Agent, or Firm* — McCarter & English, LLP; Steven G. Davis; Zhongyu "Alex" Wang

(57) ABSTRACT

A process for the preparation of ultrafiltration and microfiltration polymeric flat sheet separation membranes is disclosed, the process comprising a unidirectional cooling step. Membranes prepared according to the process exhibit numerous advantages over ultrafiltration and microfiltration membranes prepared via conventional processes. In particular, the membranes prepared by the present process exhibit remarkable pure water flux, superior mechanical properties and increased anti-fouling characteristics. Also disclosed are particular PVDF ultrafiltration and microfiltration membranes having improved flux, mechanical and anti-fouling properties.

19 Claims, 27 Drawing Sheets

Figure 1:
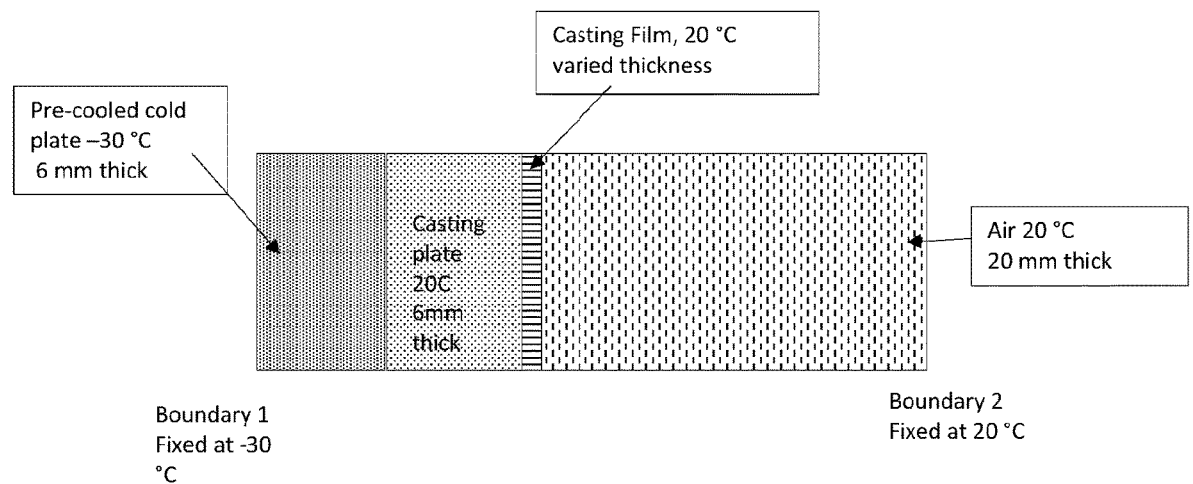

(52) U.S. Cl.
CPC .......... *B01D 71/34* (2013.01); *B01D 2323/08* (2013.01); *B01D 2323/12* (2013.01); *B01D 2325/02* (2013.01); *B01D 2325/028* (2013.01); *B01D 2325/20* (2013.01); *B01D 2325/24* (2013.01)

(56) References Cited

U.S. PATENT DOCUMENTS

| | | |
|---|---|---|
| 5,013,339 A | 5/1991 | Mahoney et al. |
| 6,013,688 A | 1/2000 | Pacheco et al. |
| 2005/0170159 A1 | 8/2005 | Ramsey et al. |
| 2008/0264862 A1 | 10/2008 | Chen et al. |
| 2010/0176537 A1 | 7/2010 | Zheng |
| 2012/0031843 A1* | 2/2012 | Holzl ................. B01D 67/0006 210/650 |
| 2014/0210118 A1 | 7/2014 | Lee et al. |

FOREIGN PATENT DOCUMENTS

| | | |
|---|---|---|
| CN | 104624061 A | 5/2015 |
| EP | 2008706 A1 | 12/2008 |
| KR | 20070105759 A | 10/2007 |
| KR | 20150033378 A | 4/2015 |
| WO | 2005/123234 A1 | 12/2005 |
| WO | 2009/097745 A1 | 8/2009 |

\* cited by examiner

SEPARATION MEMBRANES

CROSS-REFERENCE TO RELATED APPLICATIONS

This application is a 35 U.S.C. § 371 national stage application of International Application No. PCT/GB2017/051089, filed Apr. 19, 2017, which claims priority to United Kingdom Patent Application No. 1606988.2, filed Apr. 21, 2016.

INTRODUCTION

The present invention relates to flat sheet polymeric separation membranes. More specifically, the present invention relates to flat sheet polymeric ultrafiltration and microfiltration membranes. The present invention also relates to processes of preparing the flat sheet polymeric separation membranes, as well as uses of the flat sheet polymeric separation membranes in ultrafiltration and microfiltration applications, particularly those that are water-based.

The research leading to these results has received funding from the People Programme (Marie Curie Actions) of the European Union's Seventh Framework Programme (FP7/2007-2013) under REA grant agreement no 627591.

BACKGROUND OF THE INVENTION

Filtration is a separation process based on size exclusion through a porous media, where liquids and small particles pass the pores, but bigger particles are rejected. Porous membranes have been widely used in liquid filtration for drinking water production, wastewater treatment, dialysis, beverage clarification, etc. Membrane-based filtration is now a business of tens of billions USD per year, among which microfiltration (MF, pore size>100 nm) and ultrafiltration (UF, pore size ranging from 2-100 nm) share the biggest part of the total membrane market.

Among all kinds of MF/UF membranes materials, poly(vinylidene fluoride) (PVDF) is one of the most commonly used due to its outstanding inert material natures. PVDF membranes are able to withstand wide range of harsh chemical and thermal conditions, and possess good mechanical strength (1, 2); particularly, PVDF can survive from chlorination disinfection, making it predominant in the pre-treatment units of seawater desalination plants and in wastewater treatments. Nevertheless, PVDF membranes suffer from low permeation fluxes, and most commercial PVDF membranes for industrial use only allow pure water to permeate with a flux of less than 200 litre per square meter membrane area per hour (LMH) under 1 bar pressure difference across the membrane. To compensate the low flux of PVDF membranes, larger membrane areas are required to treat a large volume of water. It is very often that in a seawater desalination plant, the pre-treatment unit composed of hundreds of PVDF UF membrane module trains occupies a large ground, and the total PVDF membrane area could exceed 500,000 m$^2$. The requirement of large membrane area increases not only the capital investment, but also the daily operating costs (for energy and maintenance) of the filtration units. Therefore, improving the permeation flux of PVDF membranes is crucial to reduce the costs and energy consumption in filtration plants.

Currently, PVDF membranes (and other MF/UF polymeric membranes) are produced via phase separation methods; predominately the non-solvent induced phase-separation (NIPS) method (2, 3), though some commercial membranes are produced by the thermal induced phase-separation (TIPS) method (4-6). An excellent review on the preparation and modification of PVDF membranes has been provided by Liu et al (2). Complex physical-chemical factors are involved in the phase-inversion process, such as inter-diffusion of solvent and non-solvent, rheology of polymer solution, hydrodynamic interfacial instabilities, and even ambient temperature and humidity. (2, 3, 7) Therefore controlling the quality of final membrane products is extremely complicated, and often an ideal structure with minimised permeation resistance is difficult to achieve.

In the field of materials engineering, a very simple approach called "freeze drying" is often used to produce porous materials (8-10). This method uses solvent crystallisation to produce pores, wherein the solvent crystallites serve as pore-forming templates. However, with such a method, the pores obtained are usually too big for precision separations, and the flux characteristics of the membranes are suboptimal. A few attempts have been made to use this approach to produce PVDF membranes. However, those attempts failed to produce membranes with pore size smaller than 250 nm (11, 12), which is far from the most preferred pore sizes (20-100 nm) for PVDF membranes.

The present invention was devised with the foregoing in mind.

SUMMARY OF THE INVENTION

According to a first aspect of the present invention there is provided a process for the preparation of a flat sheet polymeric membrane having an average pore size of 0.01-10 μm, the process comprising the steps of:
  a) providing a polymeric dope solution comprising a polymer and a first solvent, wherein the melting temperature of the first solvent ranges from 2 to 28° C.;
  b) casting the polymeric dope solution onto a substrate to form a cast polymeric film, the cast polymeric film having a first surface being in contact with the substrate, and a second surface disposed opposite the first surface;
  c) subjecting the cast polymeric film to a cooling means, the cooling means being provided at a temperature that is 5-120° C. below the melting temperature of the first solvent; and
  d) contacting the cooled cast polymeric film with a second solvent, the second solvent being provided at a temperature below the melting point of the first solvent,
wherein during step c) only one of the first and second surfaces of the cast polymeric film is subjected to the cooling means.

According to a further aspect of the present invention there is provided a process for the preparation of a flat sheet polymeric membrane having an average pore size of 0.01-10 μm, the process comprising the steps of:
  a) providing a polymeric dope solution comprising a polymer and a first solvent, wherein the melting temperature of the first solvent is higher than or equal to the lowest stable temperature of the polymeric dope solution;
  b) casting the polymeric dope solution onto a substrate to form a cast polymeric film, the cast polymeric film having a first surface being in contact with the substrate, and a second surface disposed opposite the first surface;

c) subjecting the cast polymeric film to a cooling means, the cooling means being provided at a temperature that is 5-120° C. below the melting temperature of the first solvent; and d) contacting the cooled cast polymeric film with a second solvent, the second solvent being provided at a temperature below the melting point of the first solvent, wherein during step c) only one of the first and second surfaces of the cast polymeric film is subjected to the cooling means.

According to a further aspect of the present invention, there is provided a membrane obtainable, obtained or directly obtained by a process defined herein.

According to a further aspect of the present invention, there is provided a PVDF flat sheet separation membrane having an average pore size of 10-100 nm, wherein the membrane contains substantially no α-phase of PVDF.

According to a further aspect of the present invention, there is provided a PVDF flat sheet separation membrane having an average pore size of 0.1-1.2 μm, wherein the pure water flux of the membrane is greater than 2500 L m$^{-2}$ h$^{-1}$ bar$^{-1}$ and the membrane contains substantially no α-phase of PVDF.

According to a further aspect of the present invention, there is provided a use of a membrane as defined herein for separating a solute from a feed stream.

DETAILED DESCRIPTION OF THE INVENTION

Processes of the Invention

As discussed hereinbefore, the present invention provides a process for the preparation of a flat sheet polymeric membrane having an average pore size of 0.01-10 μm, the process comprising the steps of:

a) providing a polymeric dope solution comprising a polymer and a first solvent, wherein the melting temperature of the first solvent ranges from 2 to 28° C.;

b) casting the polymeric dope solution onto a substrate to form a cast polymeric film, the cast polymeric film having a first surface being in contact with the substrate, and a second surface disposed opposite the first surface;

c) subjecting the cast polymeric film to a cooling means, the cooling means being provided at a temperature that is 5-120° C. below the melting temperature of the first solvent; and d) contacting the cooled cast polymeric film with a second solvent, the second solvent being provided at a temperature below the melting point of the first solvent, wherein during step c) only one of the first and second surfaces of the cast polymeric film is subjected to the cooling means.

The processes of the invention present a number of advantages when compared with conventional membrane preparation techniques.

Chiefly, when set along membranes manufactured according to NIPS and TIPS methods, the processes of the invention allow for the preparation of both flat sheet ultrafiltration (i.e. an average pore size of 2-100 nm) and microfiltration (i.e. an average pore size of >100 nm) polymeric (e.g. PVDF) membranes having remarkably high flux properties. Without wishing to be bound by theory, it is believed that the processes of the invention, and in particular unidirectional cooling step c), allow greater control to be exerted over the average pore size of the forming membranes. Through extensive research, the inventors have hypothesised that the inability to obtain PVDF membranes having average pore sizes of less than 250 nm via the freeze drying approach is as a result of a lack of control over the solvent crystallite size. In the practice of the freeze drying approach, the actual nuclei/crystallite sizes obtained are determined by the kinetics of nucleation/crystallisation during the transient cooling stage (13). The size and size distribution of the crystallites are dramatically affected by cooling rate. With a fast cooling rate, the size would be smaller and the size distribution would be narrower, and vice versa (13). On the other hand, during the late stage of crystallisation, small individual crystallites tend to agglomerate to form big grains, according to the so-called coursing process. The inventors have hypothesised that small crystallites, and hence small pores in the resulting membrane, can only be achieved by constraining the growth of the individual crystallites during the latter stages of the freeze drying technique, thereby prohibiting their agglomeration into larger crystallites that would otherwise result in larger pores in the resulting membrane. The inventors have now discovered that fine control over the solvent crystallite size can be achieved by the use of a novel unidirectional cooling step during the membrane manufacturing process.

The inventors have determined that by using controlled unidirectional cooling during the membrane manufacturing process, it is possible to create a chemical potential difference that drives the polymer solute to diffuse towards the cooled region, such that the growth of solvent crystallites can be sterically hindered by the enriched polymer content at this region. Without wishing to be bound by theory, when a cast film of polymer solution is unidirectionally cooled from one side to a temperature below the freezing point, a temperature gradient will be built in the cast film. At the colder side, accompanying nucleation/crystallisation of the solvent, the remaining polymer solution will enter the unstable region in the phase diagram and start to demix due to the reduction of the solvent in the liquid phase and the reduced solubility of polymer at lower temperatures. Upon demixing, the polymer starts to precipitate instantly, which leads the polymer concentration in the remaining liquid phase to be much smaller than the adjacent polymer solution at higher temperatures and drives polymer solute to diffuse towards the cold end, forming a denser layer than the hotter parts. It is apparent that the amount of diffused polymer solute is determined by the diffusivity of the polymer, the polymer concentration difference (which is affected by the temperature gradient) and the time available for diffusion before the liquid phase is frozen. In an ideal condition, enough polymer solute can diffuse to the cold end accompanying the nucleation/crystallisation of the solvent, and fill into the space between solvent crystallites, thus sterically hinder the agglomeration of the crystallites to stop them from forming big grains, which would otherwise serve as templates for large pores in the finished membrane.

In essence, during the process of the invention, crystallisation of the dope solution solvent happens prior to thermally-induced polymer precipitation. It is believed that the solvent crystallites serve as templates for pores in the finished membrane.

Hence, during the process of the invention, at least a portion of the dope solution solvent has crystallised by the time that the polymer begins to precipitate. This is in direct contrast to TIPS techniques, in which the dope solution solvent remains in liquid form throughout phase-separation of the polymer.

Aside from affording ultrafiltration and microfiltration membranes having remarkably high flux characteristics, the membranes obtainable by the processes of the invention have superior mechanical properties when compared with membranes prepared from conventional NIPS techniques. In particular, the membranes obtainable by the processes of the invention are more rigid than NIPS-prepared membranes, and are able to withstand higher pressures. The membranes obtainable by the processes of the invention also offer greater abrasion resistance, and can withstand a greater drag force produced by flowing water, than conventional NIPS-prepared single-layer membranes. Without wishing to be bound by theory, in the context of PVDF, it is understood that these improved mechanical properties are attributable to the present processes' tendency to afford membranes having a mixture of β-phase and γ-phase PVDF, but no α-phase PVDF (when measured by XRD), unlike NIPS-prepared PVDF membranes, which typically show a large proportion of α-phase. Aside from mechanical properties, the membranes obtainable by the process of the invention show improved anti-fouling characteristics when compared with conventionally-prepared membranes.

In an embodiment, the polymer is selected from PVDF, poly(ethersulfone), cellulose acetate, poly(acrylonitrile), poly(ether ether ketone), sulfonated poly(ether ether ketone), poly(benzimidazole), sulfonated poly(benzimidazole), poly(imide), poly(lactic acid), poly(vinyl alcohol), poly(vinyl chloride), poly(methyl methacrylate), ethylene vinyl alcohol copolymer, poly-L-lactide, poly-DL-lactide, oligodimethylsiloxane-grafted aromatic poly(amide-imide) copolymer, perfluorosulfonated poly(arylene ether sulfone) multiblock copolymers, cyclodextrin polymers and mixtures thereof. Suitably, the polymer is selected from PVDF, poly(ethersulfone) and cellulose acetate. More suitably, the polymer is selected from PVDF and poly(ethersulfone).

In a particularly suitable embodiment, the polymer used in the polymeric dope solution of step a) is PVDF. The PVDF may have any suitable molecular weight. Suitably, the molecular weight ($M_w$) of the PVDF ranges from 80 kg mol$^{-1}$ to 1100 kg mol$^{-1}$. More suitably, the molecular weight of the PVDF ranges from 200 kg mol$^{-1}$ to 800 kg mol$^{-1}$. Even more suitably, the molecular weight of the PVDF ranges from 250 kg mol$^{-1}$ to 550 kg mol$^{-1}$.

The first solvent has a melting temperature of 2-28° C. Exemplary first solvents include acetic acid, benzene, t-butyl alcohol, cyclohexane, DMSO, dioxane, glycerine, hexamethylphosphoramide, p-xylene, and mixtures thereof, of which particular preference is given to first solvents that are non-toxic or substantially non-toxic. Suitably, the first solvent has a melting temperature of 10-25° C. More suitably, the first solvent has a melting temperature of 12-22° C. In a particularly suitable embodiment, the first solvent is dimethyl sulfoxide (DMSO).

In an embodiment, the melting temperature of the first solvent is higher than, or equal to, the hypothetic lowest stable temperature of the polymer solution. The hypothetic lowest stable temperature of the polymer solution is understood to be the lowest temperature at which the polymer dope solution prepared in step a) is still homogenous (i.e. the polymer has not begun to precipitate). It is believed that the melting temperature of the first solvent has a bearing on the properties (e.g. structure, average pore size and flux) of the resulting membrane. When the melting temperature of the first solvent is more than 10° C. below the lowest stable temperature of the polymer solution, it is believed that performing unidirectional cooling step c) causes phase separation of the polymer (due to reduction in solvent power of the first solvent) to happen prior to crystallisation of the first solvent. In this case, it is believed that the precipitated solid polymer sterically hinders the formation of solvent crystallite, which prevents the formation of micro-channels in the membrane. As a consequence, cast polymeric films tend to result in membranes having a homogeneous structure, similar to that typically observed for TIPS-prepared membranes, with no visible pores in separation layer and on surface when observed under high-resolution SEM. Conversely, when the melting temperature of the first solvent is higher than the hypothetic lowest stable temperature of the polymer solution (if solvent crystallisation doesn't happen), it is believed that performing unidirectional cooling step c) causes crystallization of the first solvent to occur first, meaning that asymmetric structures with highly porous separation layer will be formed.

In another embodiment, the dope polymeric solution comprises 5-40 wt % of the polymer. Suitably, the dope polymeric solution comprises 10-35 wt % of the polymer. More suitably, the dope polymeric solution comprises 10-30 wt % of the polymer. Most suitably, the dope polymeric solution comprises 15-25 wt % of the polymer. Alternatively, the dope polymeric solution comprises 12.5-25 wt % of the polymer.

In an embodiment, the polymer is poly(ether sulfone) and the dope polymeric solution comprises 12.5-17.5 wt % of the polymer. Suitably, the polymer is poly(ether sulfone) and the dope polymeric solution comprises 13.5-16.5 wt % of the polymer.

In another embodiment, step b) comprises casting the polymeric dope solution onto a substrate to form a cast polymeric film having an average thickness of 0.05-5 mm. In the context of the present invention, it will be understood that the term "substrate" refers to a rigid, or substantially rigid, non-porous, sheet-like material (e.g. a plate), onto which the polymeric dope solution can be cast to form a film. Suitably, step b) comprises casting the polymeric dope solution onto a substrate to form a cast polymeric film having an average thickness of 0.05-2 mm. More suitably, step b) comprises casting the polymeric dope solution onto a substrate to form a cast polymeric film having an average thickness of 0.05-1.5 mm. Even more suitably, step b) comprises casting the polymeric dope solution onto a substrate to form a cast polymeric film having an average thickness of 0.08-1.5 mm. Most suitably, step b) comprises casting the polymeric dope solution onto a substrate to form a cast polymeric film having an average thickness of 0.08-1.2 mm. A casting blade (or doctor blade) may be used to ensure accuracy.

In step d), the second solvent is provided at a temperature below the melting point of the first solvent in order to ensure that the first solvent that was frozen during step c) does not melt, and hence does not dissolve the formed polymeric membrane. Suitably, step d) comprises contacting the cooled cast polymeric film with the second solvent in such a manner that removes the frozen first solvent from the cast polymeric film. Step d) may therefore comprise immersing the cooled cast polymeric film in a bath containing the second solvent. Multiple sequential baths may be used to effect complete removal of the first solvent. Alternatively, step d) may comprise rinsing the cooled cast polymeric film with the second solvent.

In an embodiment, the second solvent is miscible with the first solvent. Selecting a second solvent that is miscible with the first solvent assists with removal of the first solvent from the cooled cast polymeric film. In a particularly suitable embodiment, the second solvent is water provided at a temperature lower than the melting point of the first solvent.

Suitably, the second solvent is water provided at a temperature below 10° C. More suitably, the second solvent is iced water.

In step c), either the first surface or the second surface of the cast polymeric film is subjected to a cooling means provided at a temperature that is 5-120° C. below the melting temperature of the first solvent. This unidirectional cooling step therefore imparts a temperature gradient within the cast polymeric film, which, without wishing to be bound by theory, it is believed gives greater control over the average pore size of the resulting membrane. Unidirectional cooling step c) may be realised via numerous different techniques. Principally, it will be understood that either the first surface or the second surface of the cast polymeric film may be subjected to the cooling means. When the first surface of the cast polymeric film is subjected to the cooling means, such cooling means may be applied to the substrate such that the first surface of the cast polymeric film is cooled by virtue of it being in direct contact with the substrate. When the second surface of the cast polymeric film is subjected to the cooling means, such cooling means may be applied directly to the second surface, or indirectly via a second substrate the may be applied to the second surface prior to application of the cooling means.

In a particularly suitable embodiment, step c) comprises subjecting the first surface of the cast polymeric film to the cooling means.

When the temperature of the cooling means is less than 5° C. below the melting temperature of the first solvent (e.g. only 2° C. below the melting temperature of the first solvent), or greater than 120° C. below the melting temperature of the first solvent (e.g. 150° C. below the melting temperature of the first solvent), the resulting membranes do not exhibit desirable characteristics. In particular, when the temperature of the cooling means is greater than 120° C. below the melting temperature of the first solvent (e.g. 150° C. below the melting temperature of the first solvent), it is understood that the cast polymeric film undergoes significantly faster cooling. In such cases, the entirety of the cast polymeric film is frozen almost instantly, leaving virtually no time for polymer diffusion. Since it is believed that such polymer diffusion is responsible for preventing the agglomeration of crystallites of the first solvent, cast polymeric films that have been subjected to a cooling means provided at a temperature that is greater than 120° C. below the melting temperature of the first solvent tend to result in membranes having considerably larger average pore size. Consequently, it is believed that using a cooling means provided at a temperature that is 5-120° C. below the melting temperature of the first solvent results in initial crystallisation of the first solvent at the cold end of the polymeric film, which is then followed by polymer diffusion from the warm end, which affords membranes having the advantageous properties discussed herein.

In an embodiment, in step c), the cooling means is provided at a temperature that is 15-100° C. below the melting temperature of the first solvent. Suitably, in step c), the cooling means is provided at a temperature that is 25-100° C. below the melting temperature of the first solvent. More suitably, in step c), the cooling means is provided at a temperature that is 30-80° C. below the melting temperature of the first solvent. Even more suitably, in step c), the cooling means is provided at a temperature that is 40-80° C. below the melting temperature of the first solvent. Yet more suitably, in step c), the cooling means is provided at a temperature that is 40-70° C. below the melting temperature of the first solvent. In an exemplary embodiment, when the first solvent is DMSO, the cooling means is provided at a temperature of −10 to −45° C. (e.g. about −15° C. or about −30° C.).

In step c), any suitable cooling means may be used. In an embodiment, the cooling means may take the form of a chilled gas that is applied solely to the first or second surface of the cast polymeric film. In another embodiment, the cooling means may take the form of a bath comprising a chilled liquid (e.g. hexane), into which the cast polymeric film is placed in such a manner that either the first surface or the second surface is subjected to the cooling means.

In a particular embodiment, in step c), the cooling means takes the form of a cooled sheet-like structure (e.g. a plate), which is used to unidirectionally cool the cast polymeric film from either its first or second surface. Suitably, the cooled sheet-like structure is used to unidirectionally cool the cast polymeric film from its first surface. More suitably, the cooled sheet-like structure is used to unidirectionally cool the cast polymeric film from its first surface via the substrate (e.g. casting plate) onto which the polymeric film has been cast. Hence, in an embodiment, step c) comprises subjecting the substrate to the cooling means in such a manner that the first surface of the cast polymeric film is cooled. Suitably, the substrate is sheet-like, having a first surface being in contact with the cast polymeric film, and a second surface disposed opposite the first surface, such that step c) comprises contacting the second surface of the substrate with the cooled sheet-like cooling means.

When the cooling means takes the form of a cooled sheet-like structure (e.g. a plate), it may be pre-cooled to the target temperature.

When the cooling means takes the form of a cooled sheet-like structure, it may be formed from any suitable material, providing that such material can be effectively cooled to the target temperature. Suitable materials for use as the sheet-like cooling means include metals, glasses and ceramics. Suitably, the sheet-like cooling means is a cooled metal plate or a cooled glass plate. Any suitable metal or glass can be used. In a particular embodiment, the cooling means is a cooled aluminum plate or a cooled glass plate. Alternatively, the cooling means is a cooled aluminum plate, a cooled copper plate, or a cooled glass plate. The thickness of the sheet-like cooling means may vary from 1 to 30 mm. Suitably, the thickness of the sheet-like cooling means varies from 1 to 15 mm. More suitably, the thickness of the sheet-like cooling means varies from 2 to 10 mm. Most suitably, the thickness of the sheet-like cooling means varies from 4 to 8 mm (e.g. about 6 mm).

As discussed previously, the substrate refers to a rigid, or substantially rigid, non-porous, sheet-like material (e.g. a plate), onto which the polymeric film is cast. The substrate can be formed from any suitable material. Suitable materials for use as the substrate include metals, glasses, ceramics and plastics. Suitably, the substrate is a sheet of metal or a sheet of glass. Any suitable metal or glass can be used. In a particular embodiment, the substrate is a sheet of aluminum or a sheet of glass. Alternatively, the substrate is a sheet of aluminum, a sheet of copper, or a sheet of glass. The thickness of the substrate may vary from 1 to 30 mm. Suitably, the thickness of the substrate varies from 2 to 20 mm. More suitably, the thickness of the substrate varies from 2 to 15 mm. Most suitably, the thickness of the substrate varies from 4 to 12 mm (e.g. about 6 mm or about 10 mm).

The polymeric dope solution of step a) may consist essentially of, or consist of, the polymer and the first solvent. Alternatively, the polymeric dope solution may additionally contain one or more dopants suitable for increasing the hydrophilicity of the resulting membrane. Introducing a hydrophilic dopant into the polymeric membrane may increase the performance of the membrane in water-based separation applications. For example, hydrophilically-modified membranes may exhibit increased water flux when compared with unmodified membranes. Suitable dopants include hydrophilic polymers. In a particular embodiment, the polymeric dope solution contains a poly(alkylene glycol). Any suitable poly(alkylene glycol) may be used, including poly(ethylene glycol), poly(propylene glycol) and poly(butylene glycol), including copolymers thereof, branched derivatives thereof, or alkoxylated derivatives thereof (e.g. methoxy poly(ethylene glycol). Suitably, the dopant is poly(ethylene glycol) having a molecular weight of 100-2000 kDa. More suitably, the dopant is poly(ethylene glycol) having a molecular weight of 200-800 kDa (e.g. 400 kDa).

When the polymeric dope solution contains one or more dopants, the weight ratio of polymer to dopant within the polymeric dope solution is 1.5:1 to 35:1. Suitably, the weight ratio of polymer to dopant within the polymeric dope solution is 2:1 to 8:1. More suitably, the weight ratio of polymer to dopant within the polymeric dope solution is 2:1 to 6:1 (e.g. about 4:1).

In an embodiment, the membranes obtainable by the process of the invention have an average pore size of 0.01-2 µm. Suitably, the membranes obtainable by the process of the invention have an average pore size of 0.01-1.5 µm. More suitably, the membranes obtainable by the process of the invention have an average pore size of 0.01-1.1 µm. Suitably, the membranes obtainable by the process of the invention have an average pore size of 0.01-0.5 µm. Alternatively, the obtainable by the process of the invention have an average pore size of 0.01-0.8 µm.

Particular embodiments of the process of the invention are provided in the following numbered paragraphs (1) to (8):

1) A process for the preparation of a flat sheet polymeric membrane having an average pore size of 0.01-1.5 µm, the process comprising the steps of:
   a) providing a polymeric dope solution comprising a polymer and a first solvent, wherein the polymer is selected from PVDF, poly(ether sulfone) and cellulose acetate, and the first solvent has a melting temperature of 10-25° C.;
   b) casting the polymeric dope solution onto a substrate to form a cast polymeric film, the cast polymeric film having a first surface being in contact with the substrate, and a second surface disposed opposite the first surface;
   c) subjecting the cast polymeric film to a cooling means, the cooling means being provided at a temperature that is 5-120° C. below the melting temperature of the first solvent; and
   d) contacting the cooled cast polymeric film with a second solvent, the second solvent being provided at a temperature below the melting point of the first solvent,
   wherein during step c) only the first surface of the cast polymeric film is subjected to the cooling means.

2) A process for the preparation of a flat sheet polymeric membrane having an average pore size of 0.01-1.5 µm, the process comprising the steps of:
   a) providing a polymeric dope solution comprising a polymer and a first solvent, wherein the polymer is selected from PVDF, poly(ether sulfone) and cellulose acetate, and the first solvent has a melting temperature of 10-25° C.;
   b) casting the polymeric dope solution onto a substrate to form a cast polymeric film, the cast polymeric film having a first surface being in contact with the substrate, and a second surface disposed opposite the first surface;
   c) subjecting the cast polymeric film to a cooling means, the cooling means being provided at a temperature that is 40-80° C. below the melting temperature of the first solvent; and
   d) contacting the cooled cast polymeric film with a second solvent, the second solvent being provided at a temperature below the melting point of the first solvent,
   wherein during step c) only the first surface of the cast polymeric film is subjected to the cooling means.

3) A process for the preparation of a flat sheet polymeric membrane having an average pore size of 0.01-1.5 µm, the process comprising the steps of:
   a) providing a polymeric dope solution comprising a polymer and a first solvent, wherein the polymer is selected from PVDF, poly(ether sulfone) and cellulose acetate, and the first solvent has a melting temperature of 10-25° C.;
   b) casting the polymeric dope solution onto a substrate to form a cast polymeric film, the cast polymeric film having a first surface being in contact with the substrate, and a second surface disposed opposite the first surface, and wherein the substrate has a first surface being in contact with the cast polymeric film, and a second surface disposed opposite the first surface;
   c) subjecting the cast polymeric film to a cooling means, the cooling means being provided at a temperature that is 40-80° C. below the melting temperature of the first solvent; and
   d) contacting the cooled cast polymeric film with a second solvent, the second solvent being provided at a temperature below the melting point of the first solvent,
   wherein step c) comprises subjecting only the first surface of the cast polymeric film to the cooling means by applying the cooling means to the second surface of the substrate.

4) A process for the preparation of a flat sheet polymeric membrane having an average pore size of 0.01-1.5 µm, the process comprising the steps of:
   a) providing a polymeric dope solution comprising a polymer and a first solvent, wherein the polymer is selected from PVDF, poly(ether sulfone) and cellulose acetate, and the first solvent has a melting temperature of 10-25° C.;
   b) casting the polymeric dope solution onto a substrate to form a cast polymeric film, the cast polymeric film having a first surface being in contact with the substrate, and a second surface disposed opposite the first surface, and wherein the substrate has a first surface being in contact with the cast polymeric film, and a second surface disposed opposite the first surface;
   c) subjecting the cast polymeric film to a cooling means, the cooling means being a sheet-like structure (e.g. a plate) or a liquid, and being provided at a temperature that is 40-80° C. below the melting temperature of the first solvent; and
   d) contacting the cooled cast polymeric film with a second solvent, the second solvent being provided at a temperature below the melting point of the first solvent, wherein step c) comprises subjecting only the first surface of the cast polymeric film to the cooling means by applying the cooling means to the second surface of the substrate.

5) A process for the preparation of a flat sheet polymeric membrane having an average pore size of 0.01-1.5 μm, the process comprising the steps of:
  a) providing a polymeric dope solution comprising a polymer and a first solvent, wherein the polymer is selected from PVDF, poly(ether sulfone) and cellulose acetate, and the first solvent has a melting temperature of 10-25° C.;
  b) casting the polymeric dope solution onto a substrate to form a cast polymeric film, the cast polymeric film having a first surface being in contact with the substrate, and a second surface disposed opposite the first surface, and wherein the substrate has a first surface being in contact with the cast polymeric film, and a second surface disposed opposite the first surface;
  c) subjecting the cast polymeric film to a cooling means, the cooling means being a plate formed from a metal, glass or ceramic, or a liquid (e.g. hexane), and being provided at a temperature that is 40-80° C. below the melting temperature of the first solvent; and
  d) contacting the cooled cast polymeric film with a second solvent, the second solvent being provided at a temperature below the melting point of the first solvent,
wherein step c) comprises subjecting only the first surface of the cast polymeric film to the cooling means by applying the cooling means to the second surface of the substrate.

6) A process for the preparation of a flat sheet polymeric membrane having an average pore size of 0.01-1.5 μm, the process comprising the steps of:
  a) providing a polymeric dope solution comprising a polymer and a first solvent, wherein the polymer is selected from PVDF, poly(ether sulfone) and cellulose acetate, and the first solvent has a melting temperature of 10-25° C.;
  b) casting the polymeric dope solution onto a substrate having a thickness of 2-20 mm to form a cast polymeric film having a thickness of 0.05-2 mm, the cast polymeric film having a first surface being in contact with the substrate, and a second surface disposed opposite the first surface, and wherein the substrate has a first surface being in contact with the cast polymeric film, and a second surface disposed opposite the first surface;
  c) subjecting the cast polymeric film to a cooling means, the cooling means being a plate formed from a metal or glass, or a liquid (e.g. hexane), and being provided at a temperature that is 40-80° C. below the melting temperature of the first solvent; and
  d) contacting the cooled cast polymeric film with a second solvent, the second solvent being provided at a temperature below the melting point of the first solvent,
wherein step c) comprises subjecting only the first surface of the cast polymeric film the cooling means by applying the cooling means to the second surface of the substrate.

7) A process for the preparation of a flat sheet polymeric membrane having an average pore size of 0.01-1.5 μm, the process comprising the steps of:
  a) providing a polymeric dope solution comprising a polymer and a first solvent, wherein the polymer is selected from PVDF and poly(ether sulfone), and the first solvent has a melting temperature of 10-25° C.;
  b) casting the polymeric dope solution onto a substrate having a thickness of 2-20 mm to form a cast polymeric film having a thickness of 0.05-2 mm, the cast polymeric film having a first surface being in contact with the substrate, and a second surface disposed opposite the first surface, and wherein the substrate has a first surface being in contact with the cast polymeric film, and a second surface disposed opposite the first surface;
  c) subjecting the cast polymeric film to a cooling means, the cooling means being a plate formed from a metal or glass, and being provided at a temperature that is 40-80° C. below the melting temperature of the first solvent; and
  d) contacting the cooled cast polymeric film with a second solvent, the second solvent being provided at a temperature below the melting point of the first solvent,
wherein step c) comprises subjecting only the first surface of the cast polymeric film the cooling means by applying the cooling means to the second surface of the substrate.

8) A process for the preparation of a flat sheet polymeric membrane having an average pore size of 0.01-1.5 μm, the process comprising the steps of:
  a) providing a polymeric dope solution comprising a polymer and a first solvent, wherein the polymer is poly(ether sulfone), and the first solvent has a melting temperature of 10-25° C.;
  b) casting the polymeric dope solution onto a substrate having a thickness of 2-20 mm to form a cast polymeric film having a thickness of 0.05-2 mm, the cast polymeric film having a first surface being in contact with the substrate, and a second surface disposed opposite the first surface, and wherein the substrate has a first surface being in contact with the cast polymeric film, and a second surface disposed opposite the first surface;
  c) subjecting the cast polymeric film to a cooling means, the cooling means being a plate formed from a metal or glass, and being provided at a temperature that is 40-80° C. below the melting temperature of the first solvent; and
  d) contacting the cooled cast polymeric film with a second solvent, the second solvent being provided at a temperature below the melting point of the first solvent,
wherein step c) comprises subjecting only the first surface of the cast polymeric film the cooling means by applying the cooling means to the second surface of the substrate.

As discussed hereinbefore, the present invention also provides membranes obtainable, obtained or directly obtained by the processes defined herein.

Membranes of the Invention

As discussed hereinbefore, the present invention also provides a PVDF flat sheet separation membrane having an average pore size of 10-100 nm, wherein the membrane contains substantially no α-phase of PVDF.

The PVDF ultrafiltration membranes of the invention have superior mechanical properties when compared with PVDF ultrafiltration membranes prepared from conventional NIPS techniques. In particular, the PVDF ultrafiltration membranes of the invention are more rigid than NIPS-prepared membranes, and are able to withstand higher pressures. The PVDF ultrafiltration membranes of the invention also offer greater abrasion resistance, and can withstand a greater drag force produced by flowing water, than conventional NIPS-prepared single-layer PVDF ultrafiltration membranes. Without wishing to be bound by theory, it is understood that these improved mechanical properties are attributable to the fact that the PVDF ultrafiltration membranes of the invention have only β-phase and γ-phase PVDF (and no α-phase of PVDF) when analysed by XRD spectroscopy, unlike NIPS-prepared PVDF ultrafiltration membranes, which typically show a large proportion of α-phase. Aside from mechanical properties, the PVDF ultrafiltration membranes of the invention show improved anti-fouling characteristics when compared with conventionally-prepared ultrafiltration membranes.

Another key advantage of the PVDF ultrafiltration membranes of the invention is that they exhibit vastly superior flux characteristics when compared with ultrafiltration membranes prepared by conventional techniques. In an embodiment, the pure water flux of the PVDF ultrafiltration membrane is greater than 250 L m$^{-2}$ h$^{-1}$ bar$^{-1}$ (at ambient temperature). Suitably, the pure water flux of the PVDF ultrafiltration membrane is greater than 300 L m$^{-2}$ h$^{-1}$ bar$^{-1}$. More suitably, the pure water flux of the PVDF ultrafiltration membrane is greater than 350 L m$^{-2}$ h$^{-1}$ bar$^{-1}$. Even more suitably, the pure water flux of the PVDF ultrafiltration membrane is greater than 400 L m$^{-2}$ h$^{-1}$ bar$^{-1}$. Yet more suitably, the pure water flux of the PVDF ultrafiltration membrane is greater than 450 L m$^{-2}$ h$^{-1}$ bar$^{-1}$. Yet more suitably, the pure water flux of the PVDF ultrafiltration membrane is greater than 450 L m$^{-2}$ h$^{-1}$ bar$^{-1}$. Most suitably, the pure water flux of the PVDF ultrafiltration membrane is greater than 500 L m$^{-2}$ h$^{-1}$ bar$^{-1}$.

As discussed hereinbefore, the present invention also provides a PVDF flat sheet separation membrane having an average pore size of 0.1-1.2 µm, wherein the pure water flux of the membrane is greater than 2500 L m$^{-2}$ h$^{-1}$ bar$^{-1}$ (at ambient temperature) and the membrane contains substantially no α-phase of PVDF.

Much like the PVDF ultrafiltration membranes of the invention, the PVDF microfiltration membranes of the invention have superior mechanical properties when compared with PVDF microfiltration membranes prepared from conventional NIPS techniques. Without wishing to be bound by theory, it is understood that these improved mechanical properties are attributable to the fact that the PVDF microfiltration membranes of the invention have no α-phase of PVDF (when analysed by XRD spectroscopy), unlike NIPS-prepared PVDF microfiltration membranes, which typically show a large proportion of α-phase.

Another key advantage of the PVDF microfiltration membranes of the invention is that they exhibit vastly superior flux characteristics when compared with microfiltration membranes prepared by conventional techniques. In an embodiment, the pure water flux of the PVDF microfiltration membrane is greater than 3000 L m$^{-2}$ h$^{-1}$ bar$^{-1}$ (at ambient temperature). Suitably, the pure water flux of the PVDF microfiltration membrane is greater than 3500 L m$^{-2}$ h$^{-1}$ bar$^{-1}$. More suitably, the pure water flux of the PVDF microfiltration membrane is greater than 4000 L m$^{-2}$ h$^{-1}$ bar$^{-1}$. Even more suitably, the pure water flux of the PVDF microfiltration membrane is greater than 4250 L m$^{-2}$ h$^{-1}$ bar$^{-1}$. Yet more suitably, the pure water flux of the PVDF microfiltration membrane is greater than 4750 L m$^{-2}$ h$^{-1}$ bar$^{-1}$. Yet more suitably, the pure water flux of the PVDF microfiltration membrane is greater than 6000 L m$^{-2}$ h$^{-1}$ bar$^{-1}$. Yet more suitably, the pure water flux of the PVDF microfiltration membrane is greater than 8000 L m$^{-2}$ h$^{-1}$ bar$^{-1}$. Most suitably, the pure water flux of the PVDF microfiltration membrane is greater than 10000 L m$^{-2}$ h$^{-1}$ bar$^{-1}$.

In an embodiment, the PVDF microfiltration membranes have an average pore size of 100-800 nm. Suitably, the PVDF microfiltration membranes have an average pore size of 100-500 nm.

When viewed in cross section, the ultrafiltration and microfiltration membranes of the invention have an asymmetric structure, albeit noticeably different to the typical asymmetric structure that is commonly observed when using the NIPS and TIPS technique. In particular, the ultrafiltration and microfiltration membranes of the invention comprise a denser skin layer (i.e. separation layer) disposed on top of a less dense supporting layer. Cross section images of the ultrafiltration and microfiltration membranes of the invention clearly show a number of tortuous pores in the separation layer, and intensively scattered pores on membrane surface. Furthermore, the supporting layer of the membranes is composed of fully opened and oriented but inter-connected micro-channels, whose size increases gradually in the direction away from the separation layer. The micro-channels give negligible resistances to water permeation. By comparison, NIPS-prepared membranes show typical asymmetric structures that will be readily familiar to those skilled in the art. A typical asymmetric structure comprises a skinned top layer supported by a region of finger-like voids and then a sponge-like layer. Although the skinned top layer of the NIPS-prepared membranes is thinner compared to the ultrafiltration and microfiltration membranes of the invention, only few pores on the membrane surface can be typically observed within a scanned area under SEM, implying a very low surface porosity. On the other hand, the ultrafiltration and microfiltration membranes of the invention have a very porous separation layer. For the membranes prepared by the TIPS technique, although they can have asymmetric structures, the cross-sections of which are typically cellular in structure.

Therefore, when viewed in cross-section, the membranes of the invention (i.e. the membranes obtainable by the present process, and the ultrafiltration and microfiltration PVDF membranes) may have a structure formed from interconnected micro-channels, whose size preferably increases gradually in the direction away from the separation layer. This is in contrast to NIPS/TIPS-prepared membranes.

It will be understood that average pore sizes recited herein were calculated by the standard gas-liquid displacement porosimetry method described in the Examples.

In an embodiment, the ultrafiltration and microfiltration membranes have an average thickness of 0.03-5 mm. The average thicknesses quoted hereinbefore refer to the casting thickness pre-determined by the casting blade. The finished membrane may be thinner (typically by 40-60%) than the casting thickness. Suitably, the ultrafiltration and microfiltration membranes may have an average thickness of 0.03-2 mm. More suitably, the ultrafiltration and microfiltration membranes have an average thickness of 0.03-1.5 mm. Even more suitably, the ultrafiltration and microfiltration membranes have an average thickness of 0.05-1.5 mm. Most suitably, the ultrafiltration and microfiltration membranes have an average thickness of 0.06-1.1 mm.

In another embodiment, 55-70% of the PVDF in the ultrafiltration and microfiltration membranes is crystalline. Crystallinity can be determined by differential scanning calorimetry (DSC). Suitably, 57-66% of the PVDF in the ultrafiltration and microfiltration membranes is crystalline.

In another embodiment, the porosity of the ultrafiltration and microfiltration membranes is greater than 70%. The overall porosity of the membranes can be determined by mercury intrusion porosimetry. NIPS-prepared membranes, however, are typically unable to withstand the high-pressures exerted during mercury intrusion porosimetry. Suitably, the porosity of the ultrafiltration and microfiltration membranes is greater than 72%. More suitably, the porosity of the ultrafiltration and microfiltration membranes is greater than 74%. Most suitably, the porosity of the ultrafiltration and microfiltration membranes is greater than 75%.

In another embodiment, the pore size distribution of the ultrafiltration and microfiltration membranes is less than or equal to 80 nm. It will be understood that the pore size distribution refers to the spread of pore sizes within the ultrafiltration and microfiltration membranes. Hence, a pore size distribution of less than 80 nm means that the pores of the ultrafiltration and microfiltration membranes do not differ from one another in average size by more than 80 nm (i.e the average pore size of the membranes may range from 310-380 nm, or from 100-110 nm). Therefore, the pores of the ultrafiltration and microfiltration membranes can be considered to be largely uniform in size. Suitably, the pore size distribution of the ultrafiltration and microfiltration membranes is less than 75 nm. More suitably, the pore size distribution of the ultrafiltration and microfiltration membranes is less than 50 nm. Even more suitably, the pore size distribution of the ultrafiltration and microfiltration membranes is less than 25 nm. Yet more suitably, the pore size distribution of the ultrafiltration and microfiltration membranes is less than 15 nm. Most suitably, the pore size distribution of the ultrafiltration and microfiltration membranes is less than 10 nm.

The ultrafiltration and microfiltration membranes of the invention may consist essentially of, or consist of, PVDF. For example, in some embodiments, the only polymer present within the ultrafiltration and microfiltration membranes of the invention is PVDF. In another embodiment, the PVDF ultrafiltration and microfiltration membranes may comprise one or more dopants (in addition to PVDF) suitable for increasing the hydrophilicity of the resulting membrane. Introducing a hydrophilic dopant into the polymeric membrane may increase the performance of the membrane in water-based separation applications. For example, hydrophilically-modified membranes may exhibit increased water flux when compared with unmodified membranes. Suitable dopants include hydrophilic polymers. In a particular embodiment, the dopant is a poly(alkylene glycol). Any suitable poly(alkylene glycol) may be used, including poly(ethylene glycol), poly(propylene glycol) and poly(butylene glycol), including copolymers thereof, branched derivatives thereof, or alkoxylated derivatives thereof (e.g. methoxy poly(ethylene glycol). Suitably, the dopant is poly(ethylene glycol) having a molecular weight of 100-2000 kDa. More suitably, the dopant is poly(ethylene glycol) having a molecular weight of 200-800 kDa (e.g. 400 kDa).

When the ultrafiltration or microfiltration membrane contains one or more dopants, the weight ratio of PVDF to dopant within the membrane is 1.5:1 to 35:1. Suitably, the weight ratio of PVDF to dopant within the membrane is 2:1 to 8:1. More suitably, the weight ratio of PVDF to dopant within the membrane is 2:1 to 6:1 (e.g. about 4:1).

In another embodiment, the 1 mm thick ultrafiltration and microfiltration membranes exhibit a maximum load of greater than 8 N with 1 cm width samples.

In another embodiment, the ultrafiltration and microfiltration membranes exhibit an elongation ratio at maximum load of 12-60%.

In another embodiment, the ultrafiltration and microfiltration membranes exhibit a tensile strength of greater than 1.0 MPa.

In another embodiment, the ultrafiltration and microfiltration membranes exhibit a Young's Modulus of 50-85 MPa.

In another embodiment, the ultrafiltration and microfiltration membranes are compressed by less than 20% of their thickness upon application of 35 bar pressure. Suitably, the ultrafiltration and microfiltration membranes are compressed by less than 10% of their thickness upon application of 35 bar pressure.

In an embodiment, the membrane obtainable by the present process is a PES membrane.

In an embodiment, the membrane obtainable by the present process is a PES membrane, and has a pure water flux greater than 1000 $L\ m^{-2}\ h^{-1}\ bar^{-1}$ (at ambient temperature). Suitably, the pure water flux of the PES membrane is greater than 2000 $L\ m^{-2}\ h^{-1}\ bar^{-1}$. Suitably, the pure water flux of the PES membrane is greater than 5000 $L\ m^{-2}\ h^{-1}\ bar^{-1}$. More suitably, the pure water flux of the PES membrane is greater than 6000 $L\ m^{-2}\ h^{-1}\ bar^{-1}$. Even more suitably, the pure water flux of the PES membrane is greater than 8000 $L\ m^{-2}\ h^{-1}\ bar^{-1}$. Yet more suitably, the pure water flux of the PES membrane is greater than 10000 $L\ m^{-2}\ h^{-1}\ bar^{-1}$.

In an embodiment, the membrane obtainable by the present process is a PES membrane, and has an average pore size of 0.1-1.0 µm, wherein the pure water flux of the membrane is greater than 6000 $L\ m^{-2}\ h^{-1}\ bar^{-1}$ (at ambient temperature).

In an embodiment, the membrane obtainable by the present process is a PES membrane, and has an average pore size of 0.01-0.1 µm, wherein the pure water flux of the membrane is greater than 1200 $L\ m^{-2}\ h^{-1}\ bar^{-1}$ (at ambient temperature).

In an embodiment, the membrane obtainable by the present process is a PES membrane, and has an average pore size of 0.1-1.0 µm, wherein the pure water flux of the membrane is greater than 2000 $L\ m^{-2}\ h^{-1}\ bar^{-1}$ (at ambient temperature). Suitably, the membrane obtainable by the present process is a PES membrane, and has an average pore size of 0.1-1.0 µm, wherein the pure water flux of the membrane is greater than 5000 $L\ m^{-2}\ h^{-1}\ bar^{-1}$.

Applications of Membranes

As discussed hereinbefore, the present invention also provides a use of a membrane as defined herein for separating a solute from a feed stream.

The membranes provided herein (i.e. the membranes obtainable by the present process, and the ultrafiltration and microfiltration PVDF membranes) offer a whole host of advantages over conventional ultrafiltration and microfiltration membranes. In particular, the advantageous properties of the present membranes—in terms of their remarkable flux, superior mechanical properties and increased anti-fouling characteristics—make them particularly well-suited for applications requiring the separation of a solute from a feed stream. In such contexts, it will be understood that the feed stream may contain a plurality of solutes requiring separation from one another, or the feed stream may contain a single solute that is to be separated from one or more solvents in which it is dissolved.

In an embodiment, the feed stream comprises water. Suitably, water is the main solvent present within the feed stream. More suitably, water is the only solvent present within the feed stream.

In another embodiment, the use of the membrane is for the purpose of drinking water production (i.e. water purification), wastewater treatment, dialysis or beverage clarification.

EXAMPLES

One or more examples of the invention will now be described, for the purpose of illustration only, with reference to the accompanying figures:

FIG. 1: The setting of initial conditions for the calculation of thermal conduction under the circumstance of unidirectional cooling with a pre-cooled plate.

Figure 2:
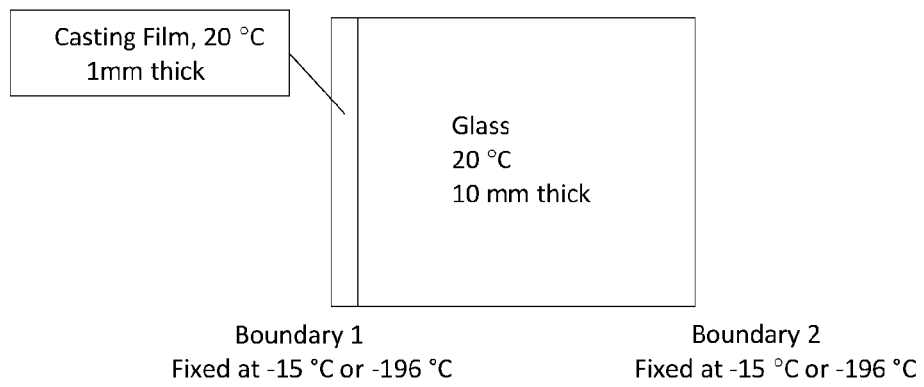

FIG. 2: The setting of initial conditions for the calculation of thermal conduction under the circumstance of unidirectional cooling with a pre-cooled liquid.

Figure 3:
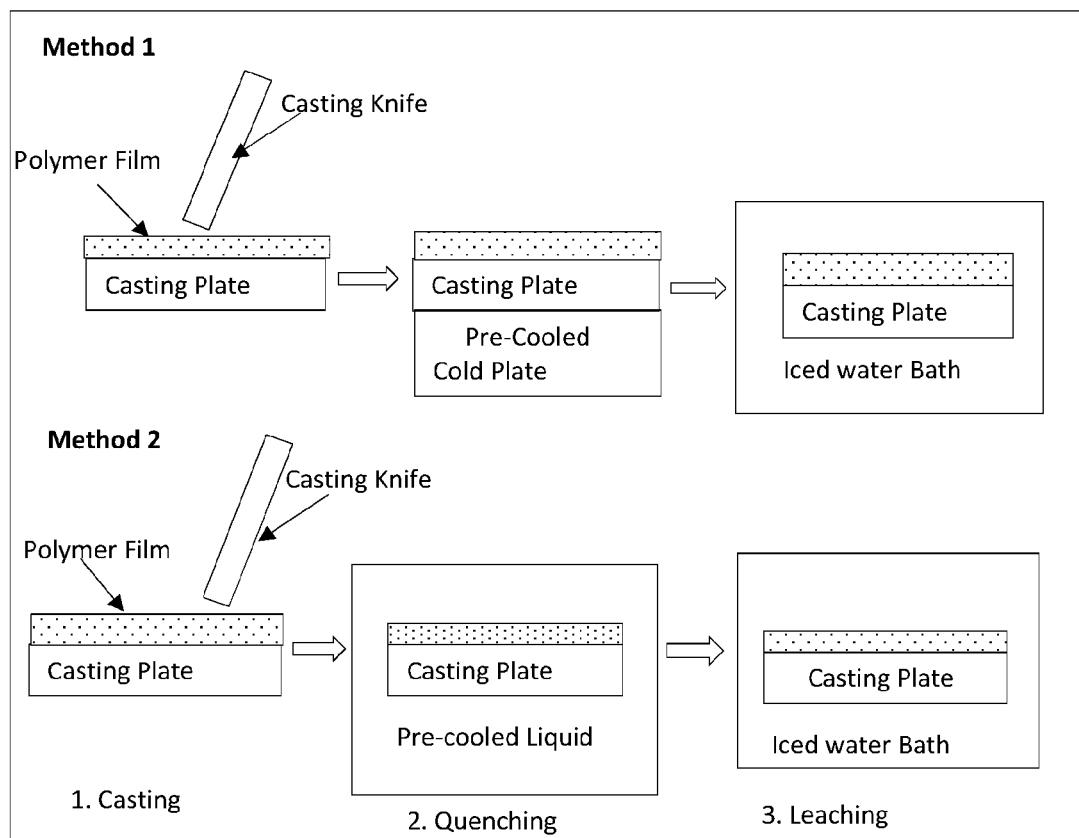

FIG. 3: Schematic showing the membrane preparation process.

Figure 4:
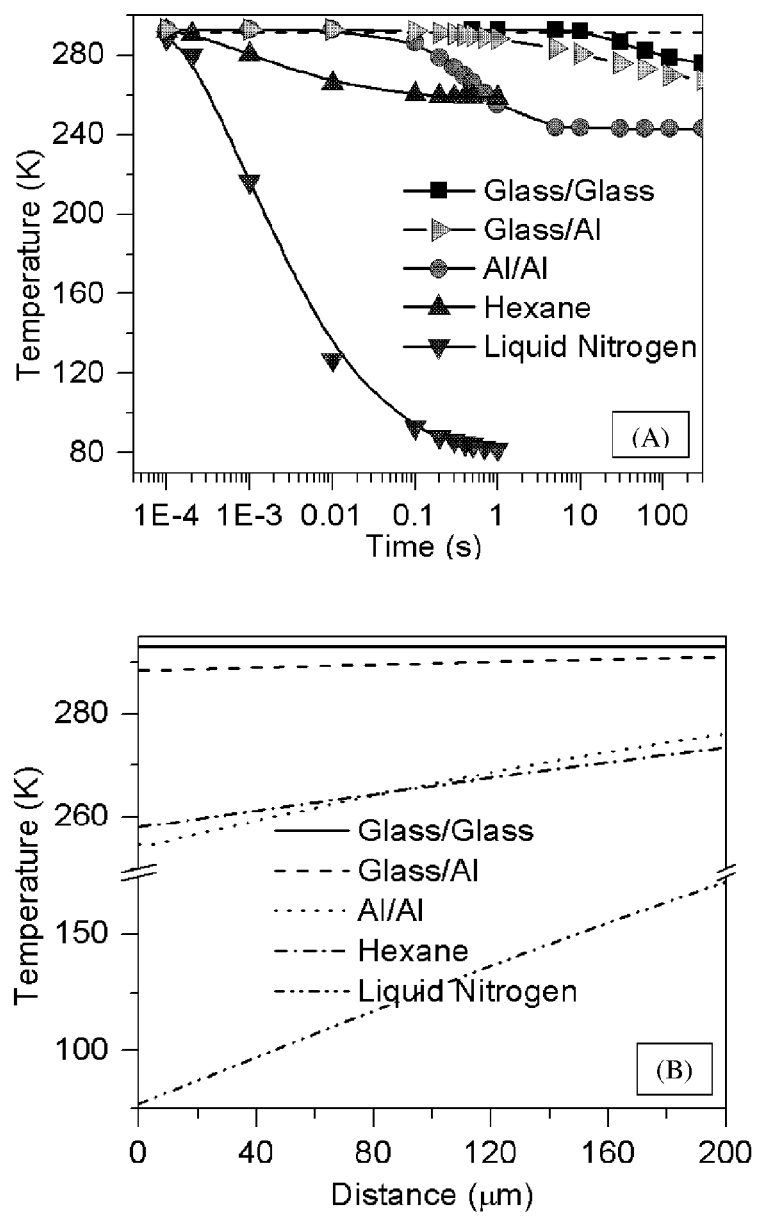
Figure 4:
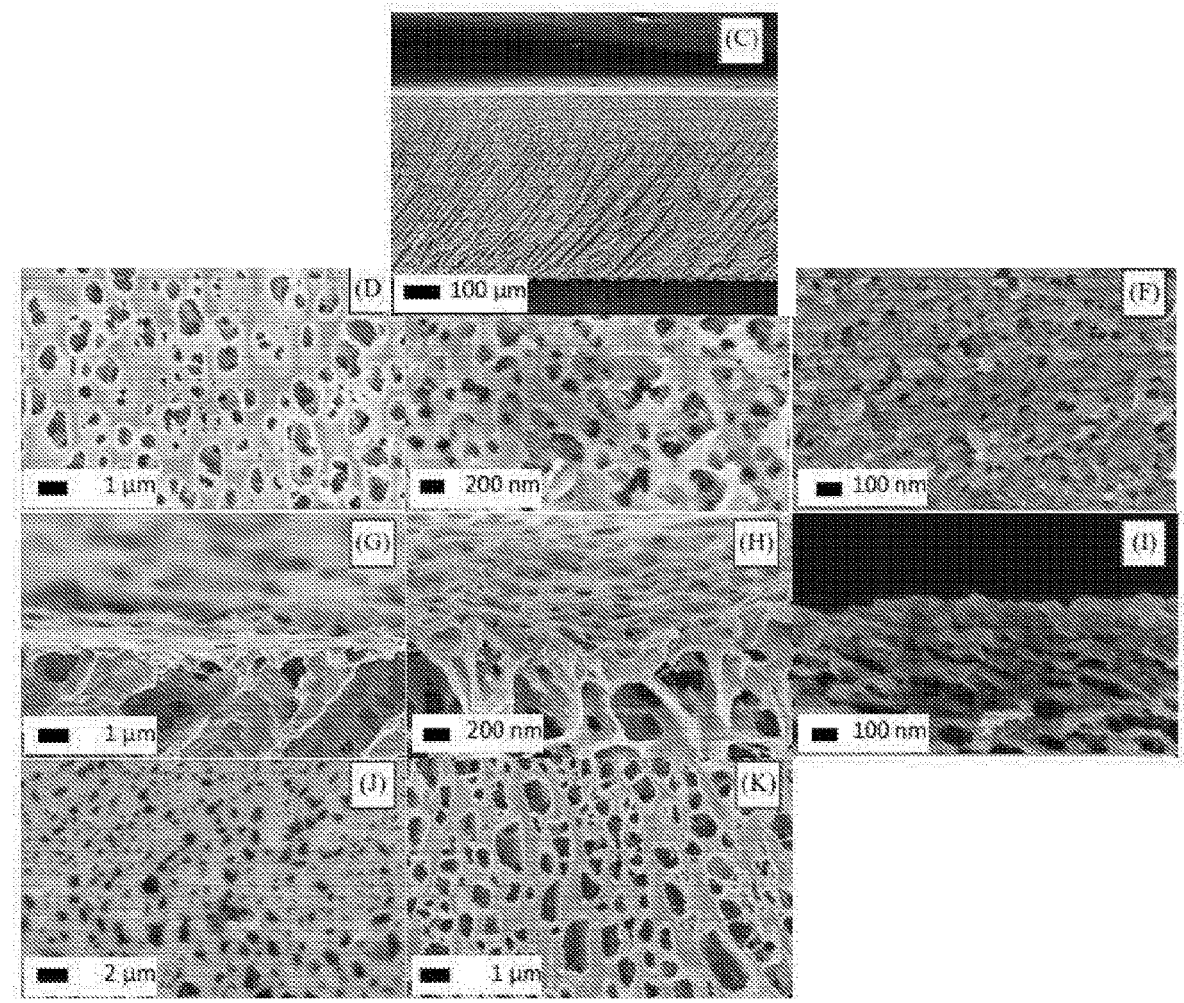

FIG. 4: PVDF membranes prepared by the combined crystallisation and diffusion method with different cooling rates. (A) Temperature change in the polymer solution at the position 10 μm away from the cooling interface; the left of the slash is the material of the cold plate, and the right is the material of the casting plate. The brown dashed line shows the melting point of the solvent DMSO. (B) Temperature profile of the polymer solution from the cold end after cooling for 1 s. (C) Cross-sectional SEM image of the Glass/Glass sample. (D-F) Cold-end surface and (G-I) top layer cross-sectional SEM images of the Glass/Glass, Glass/Al, Al/Al sample, respectively. (J) Hexane and (K) Liquid Nitrogen sample's surface SEM image.

Figure 5:
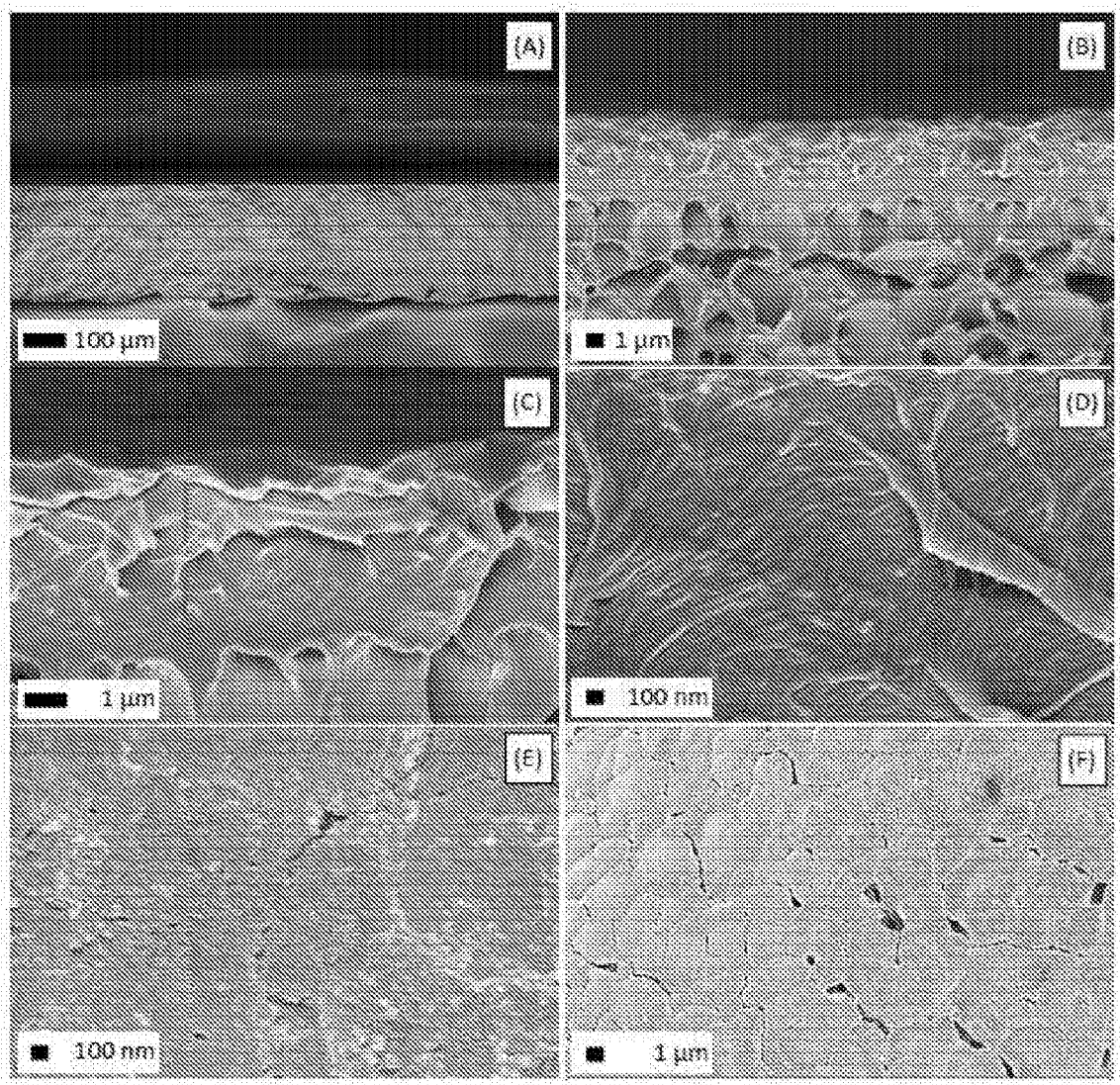

FIG. 5: SEM images of the CCD Al/Al NMP PVDF membrane. (A) Cross-sectional overview; (B, C) close view showing the separation layer; (D) high-magnification image at the separation layer; (E) surface of the separation layer; (F) surface of the back side.

Figure 6:
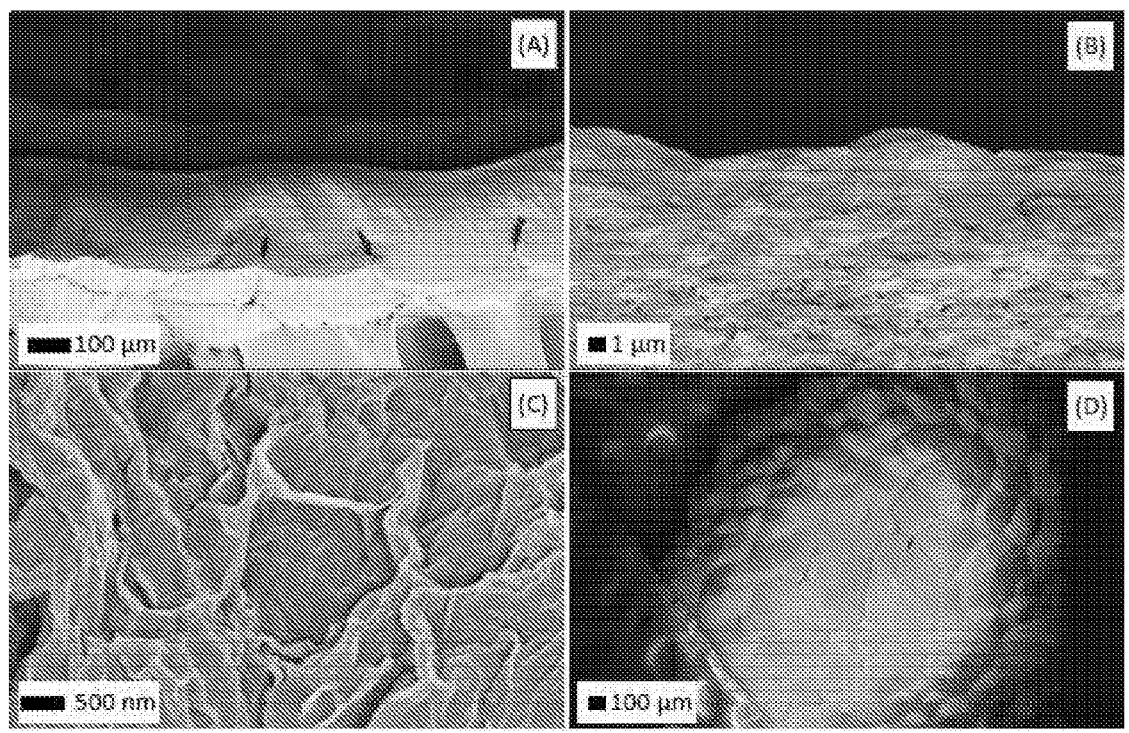

FIG. 6: SEM images of the CCD Al/Al DMAc PVDF membrane. (A) Cross-sectional overview; (B) close view showing the separation layer; (C) surface of the separation layer; (D) surface of the back side.

Figure 7:
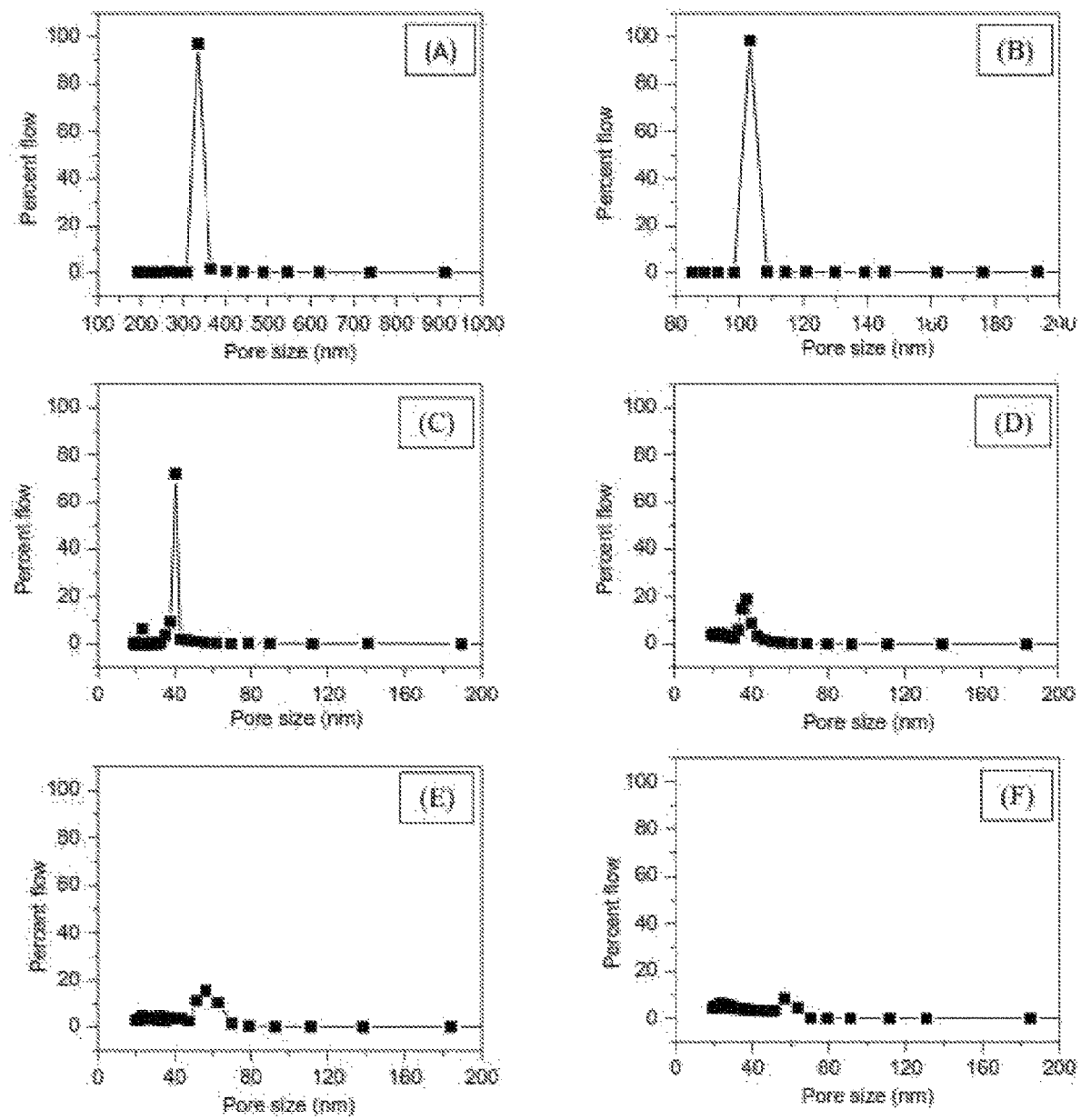

FIG. 7: Pore size distribution of PVDF membranes measured by the gas-liquid displacement method. (A) CCD Glass/Glass 1 mm sample; (B) CCD Glass/Al 1 mm sample; (C) CCD Al/Al 1 mm sample; (D) NIPS DMSO 1 mm sample; (E) NIPS DMSO 0.5 mm sample; (F) NIPS NMP 0.3 mm sample.

Figure 8:
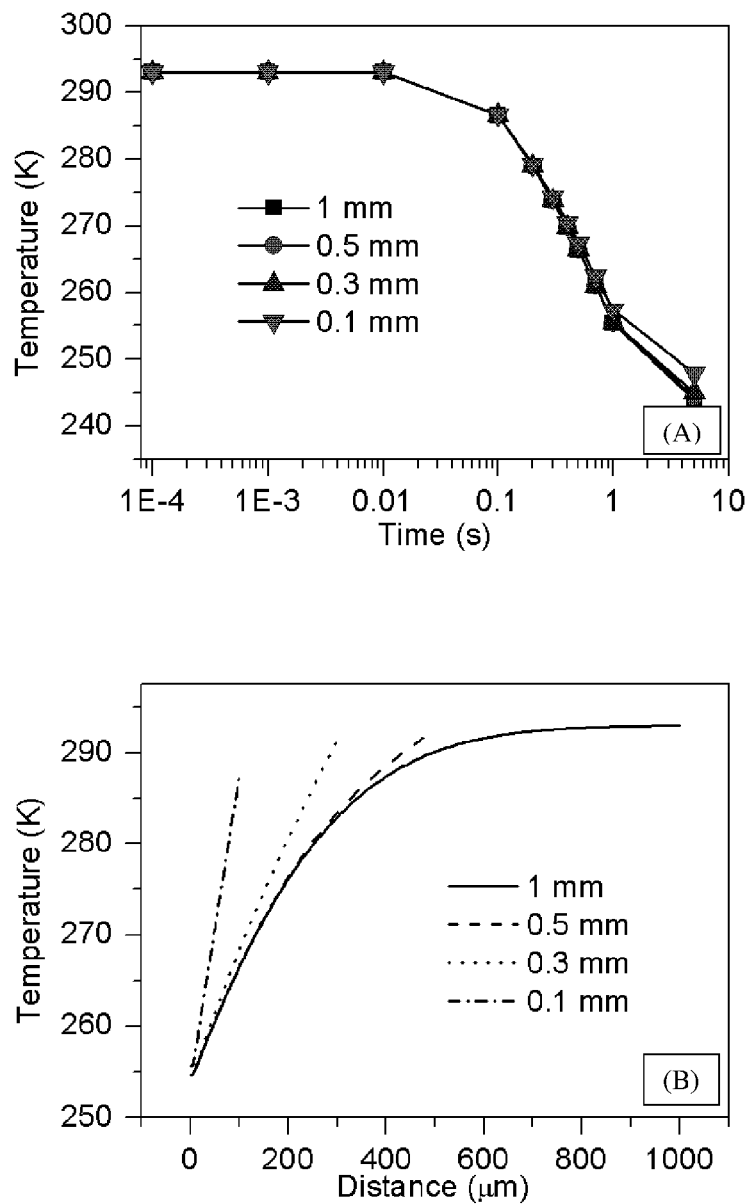
Figure 8:
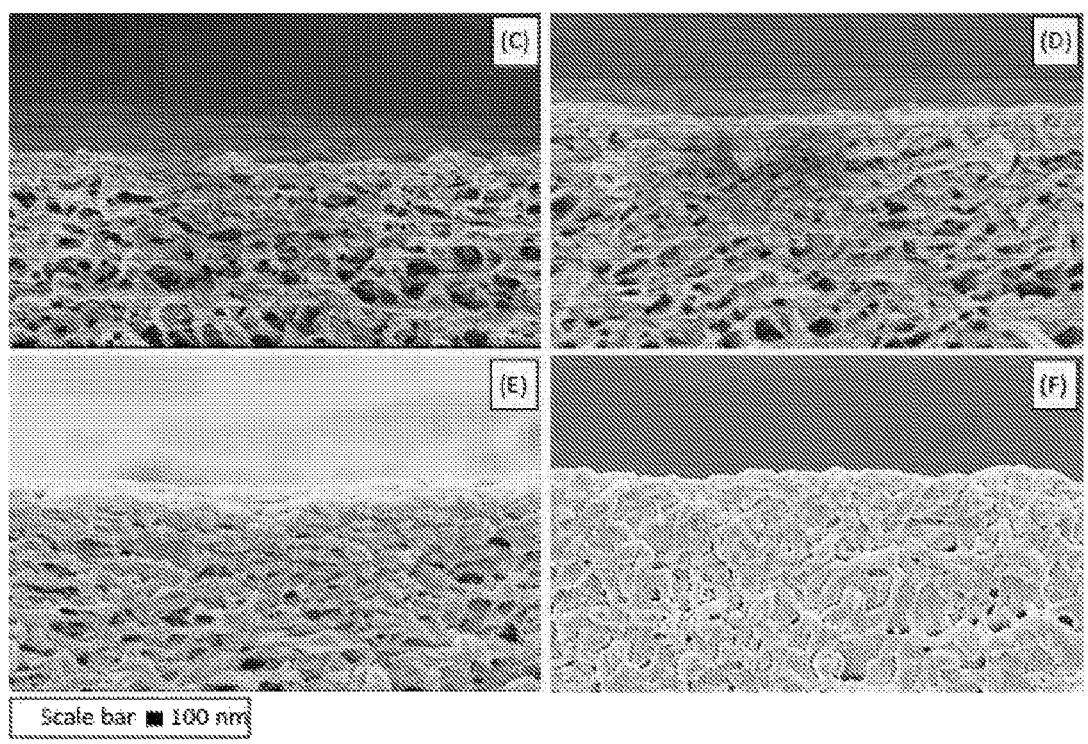

FIG. 8: CCD Al/Al PVDF membranes prepared with different casting thicknesses. (A) Temperature change in the polymer solution at the position 10 μm away from the cooling interface. (B) Temperature profile of the polymer solution from the cold end after cooling for 1 s. (C-F) Cross-sectional SEM image of the separation layer of the 1 mm, 0.5 mm, 0.3 mm and 0.1 mm sample, respectively.

Figure 9:
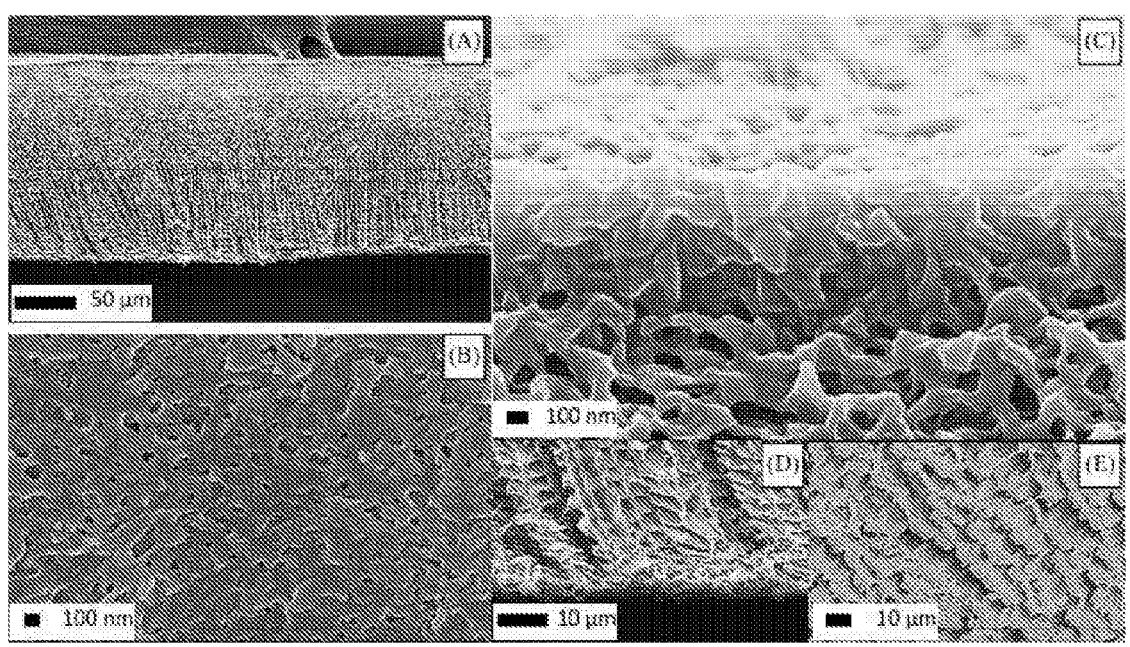

FIG. 9: SEM images of the CCD Al/Al PVDF membrane prepared with a 0.3 mm casting thickness. (A) cross-sectional overview; (B) pores on the surface; (C) pore structure in the separation layer; (D) cross-sectional view of interconnected micro-channels at the back side and (E) opened micro-channels on the back side.

Figure 10:
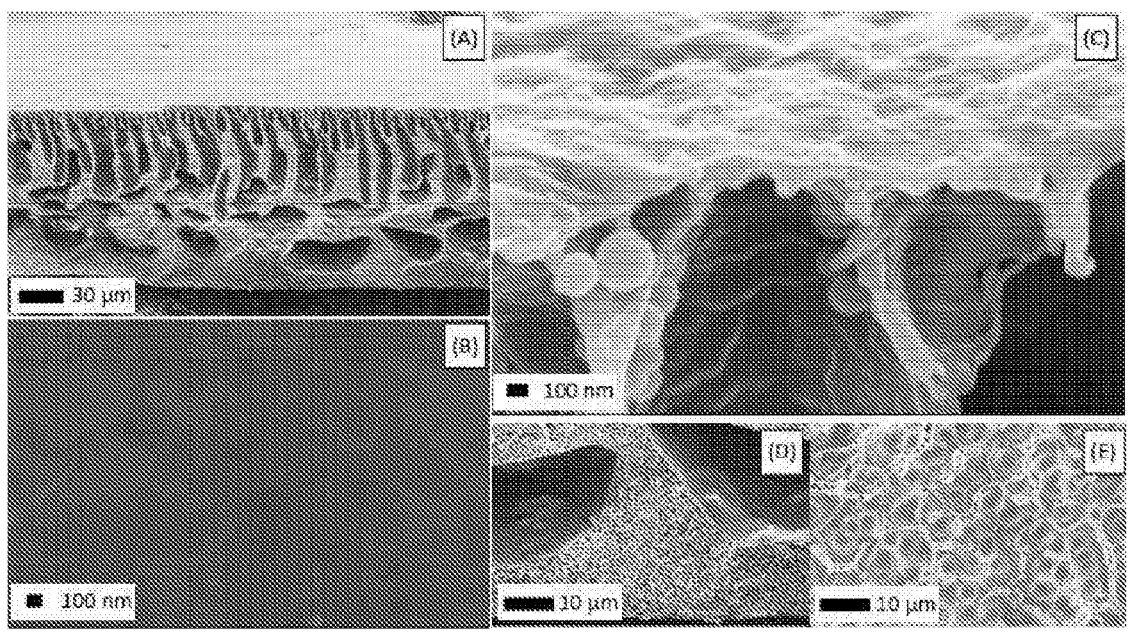

FIG. 10: SEM images of the NIPS DMSO PVDF membrane prepared with a 0.3 mm casting thickness. (A) cross-sectional overview; (B) top surface; (C) close cross-sectional view of the top layer; (D) close cross-sectional view of the back side and (E) the back surface.

Figure 11:
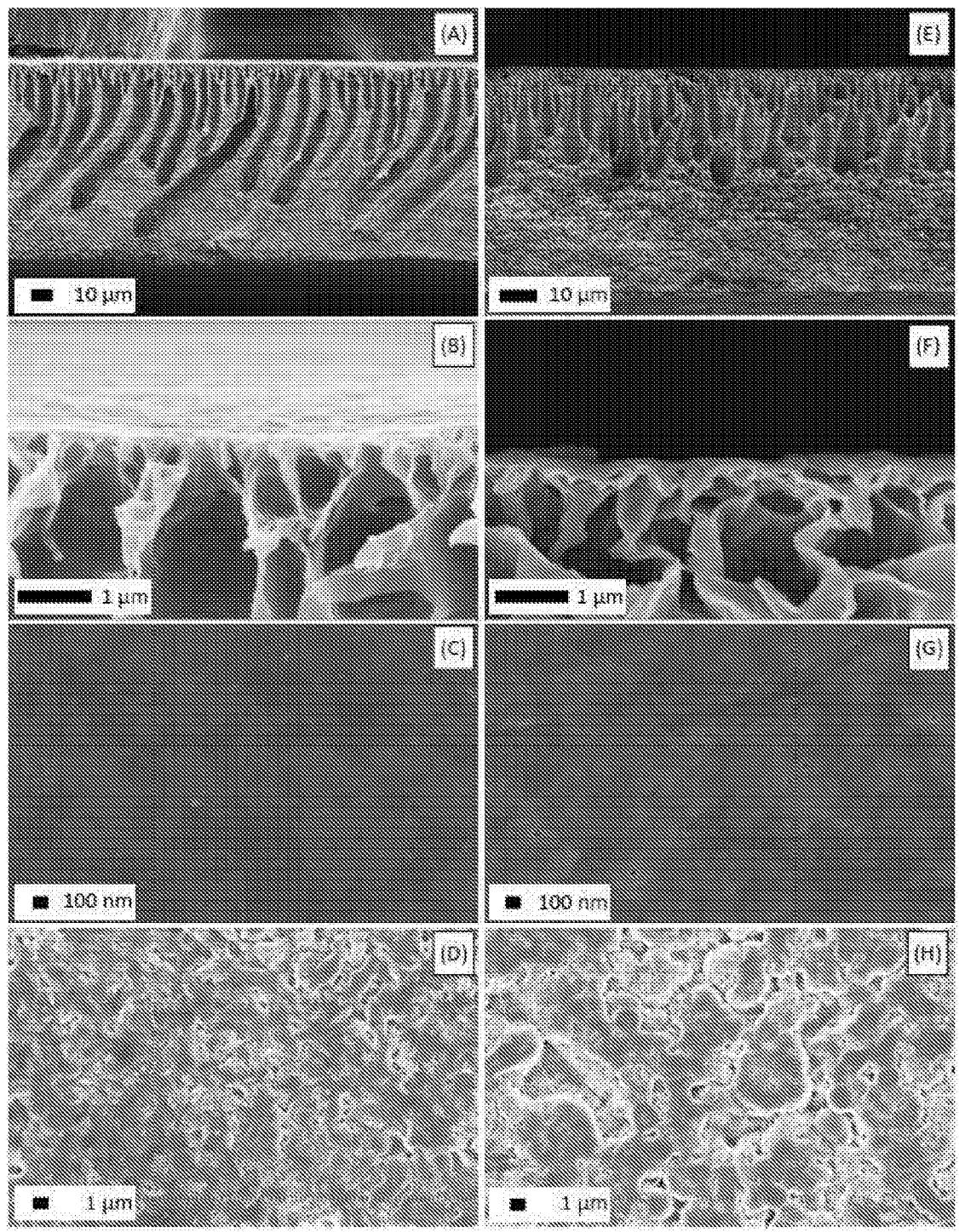

FIG. 11: SEM images of the NIPS NMP (A-D) and NIPS DMAc (E-H) PVDF membranes prepared with a 0.3 mm casting thickness. (A, E) cross-sectional overview; (B, F) close cross-sectional view of the top layer; (C, G) top surface; (D, H) the back surface.

Figure 12:
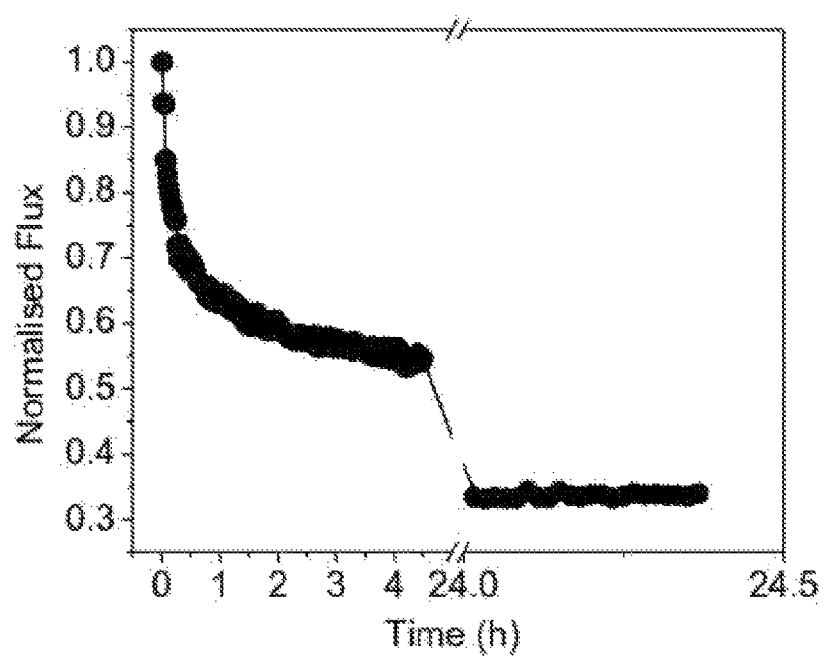

FIG. 12: BSA fouling test result of a CCD Al/Al 1.0 mm PVDF membrane.

Figure 13:
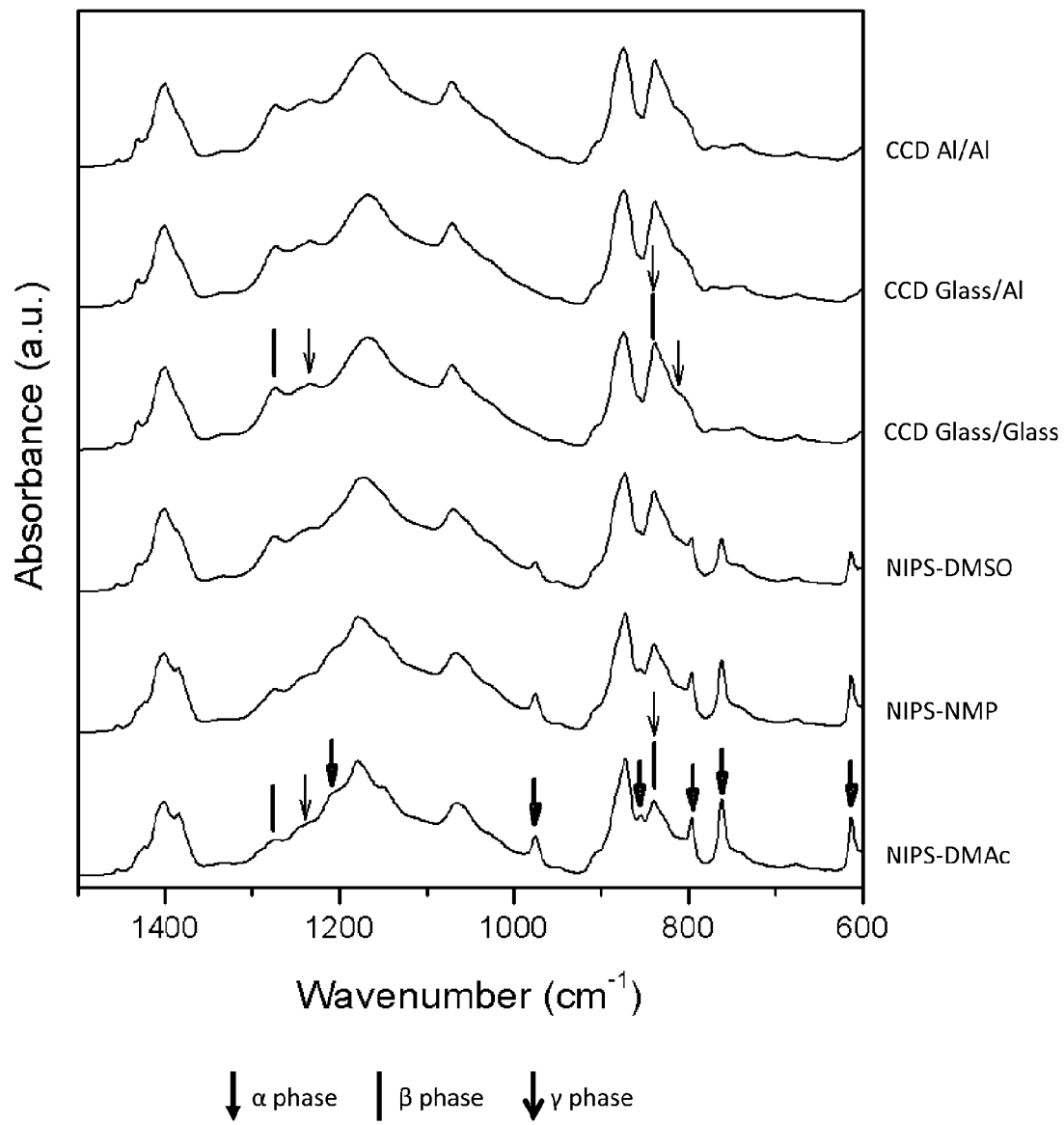

FIG. 13: FT-IR spectra of the CCD and NIPS membranes. The blue, red and black arrows point to the characteristic peaks of the α, β and γ phase PVDF, respectively. NIPS membranes all show intensive peaks of α phase, together with peaks from β and γ phase. But for the CCD membranes, all peaks of α phase disappeared.

Figure 14:
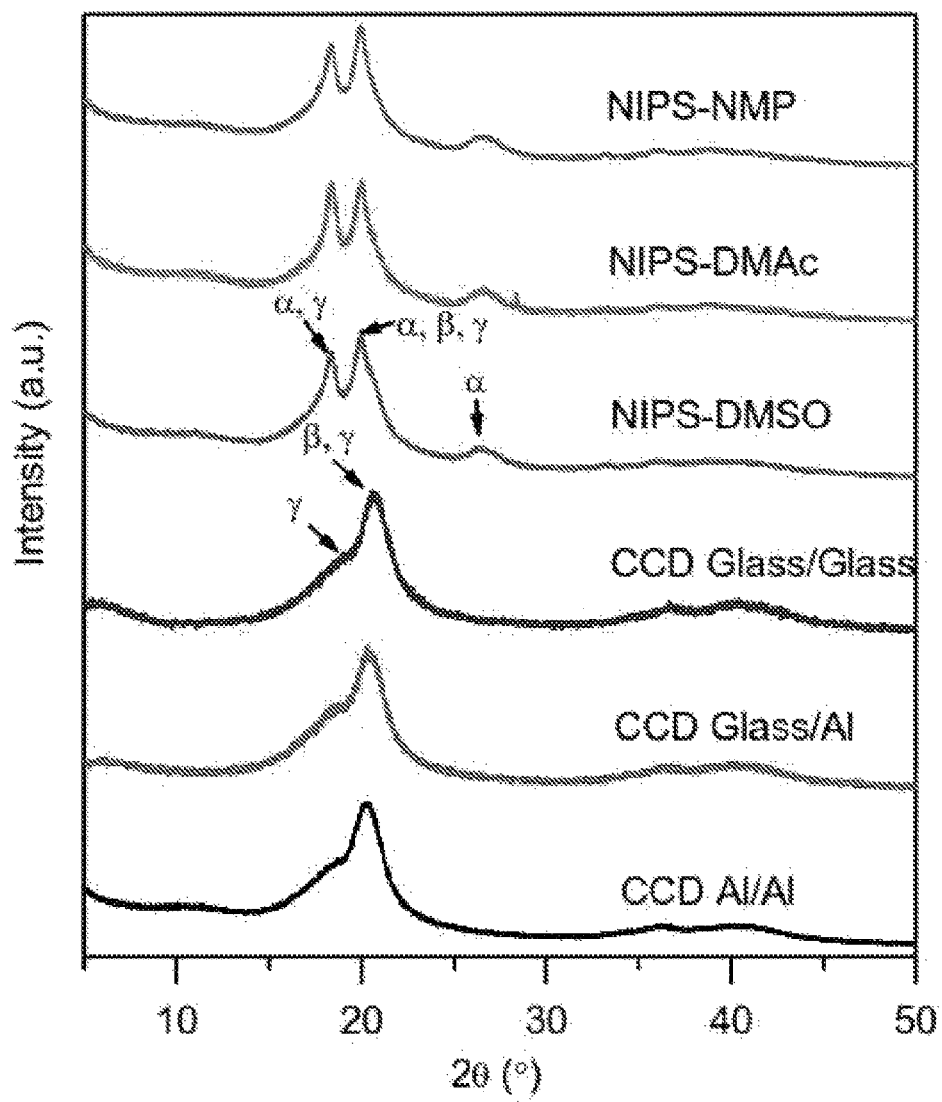

FIG. 14: XRD patterns of the CCD and NIPS membranes.

Figure 15:
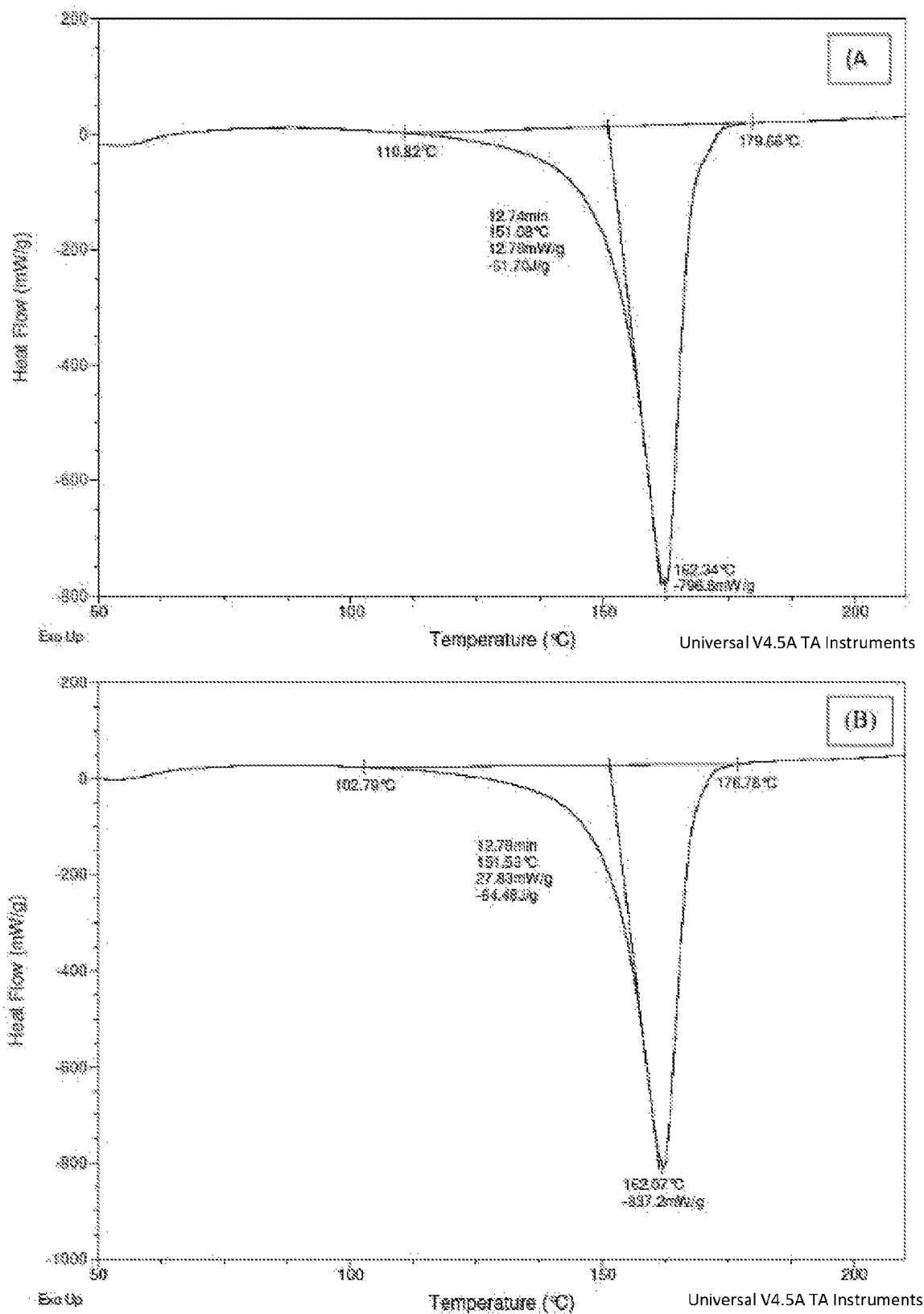
Figure 15:
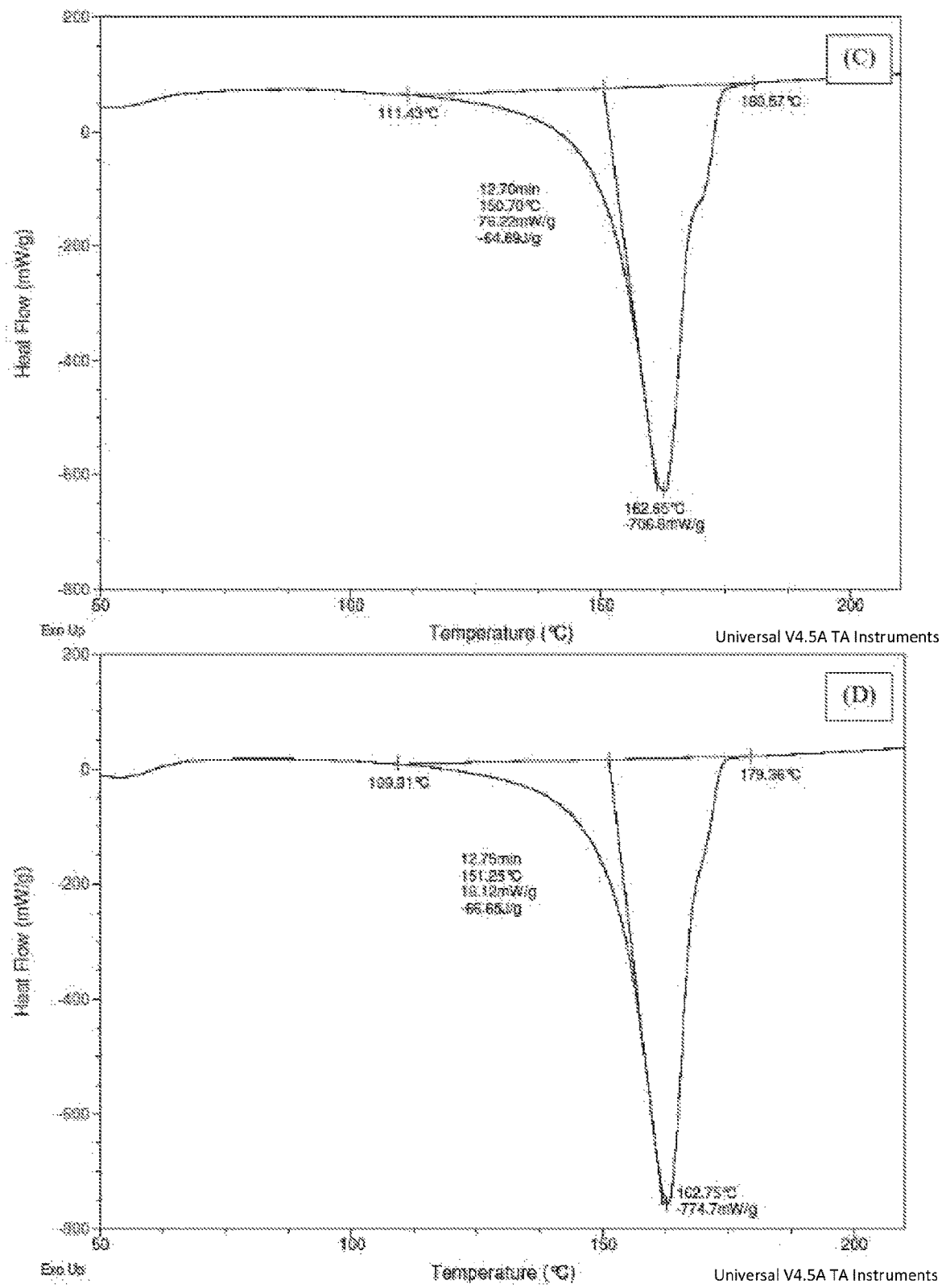

FIG. 15: DSC results of the CCD membranes. (A) Al/Al 1.0 mm, crystallinity 59%; (B) Al/Al 0.5 mm, crystallinity 62%; (C) Glass/Al 1.0 mm, crystallinity 62%; (D) Glass/Glass 1.0 mm, crystallinity 64%.

Figure 16:
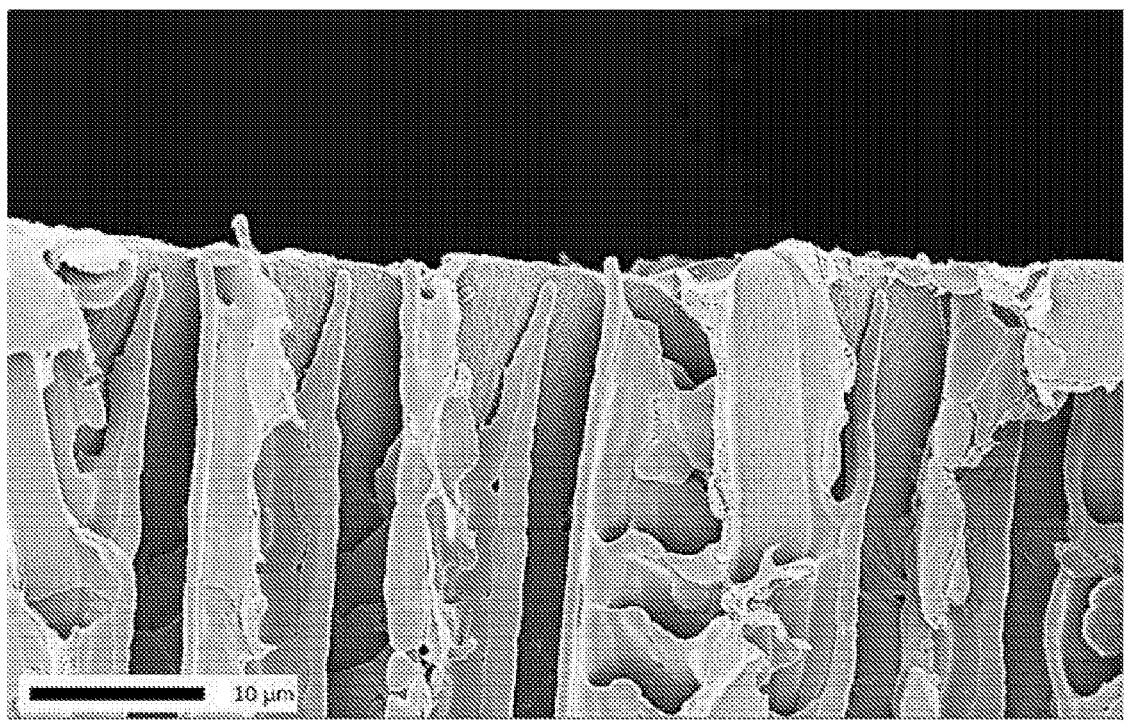

FIG. 16: SEM image of the CCD Al/Al 1.0 mm PVDF membrane. The image shows the cross section view close to the back side, which clearly depicted tightly connected PVDF grains and the grain boundary.

Figure 17:
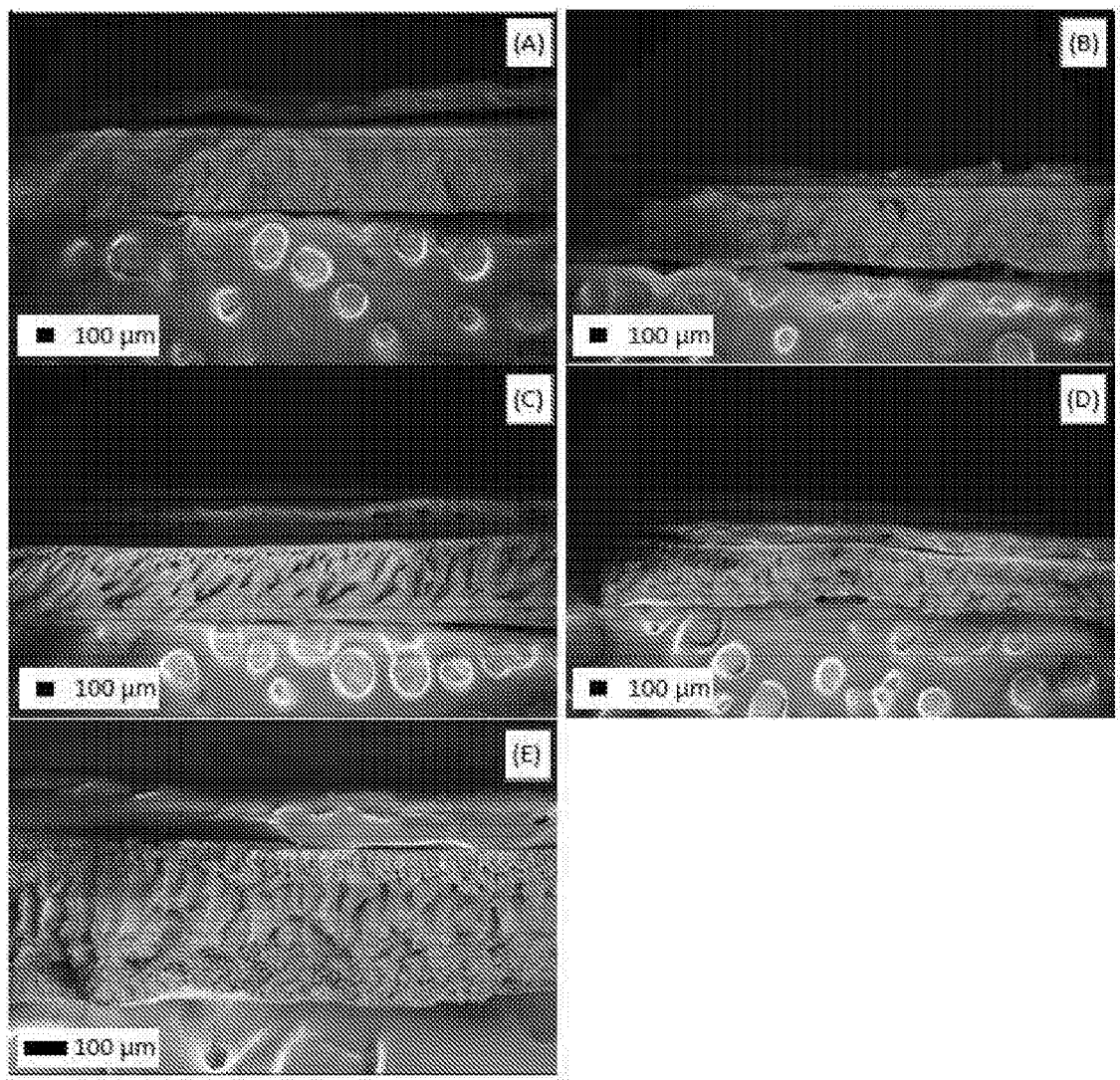

FIG. 17: CCD Al/Al 1.0 mm PVDF membrane and NIPS DMSO 1.0 mm PVDF before and after high-pressure gas-liquid displacement measurements that reached 35 bar. (A) Untested and (B) tested CCD membrane; (C) untested and (D, E) tested NIPS membrane. The tested NIPS membrane was obviously compressed and the lower part of the finger-like macrovoids collapsed.

Figure 18:
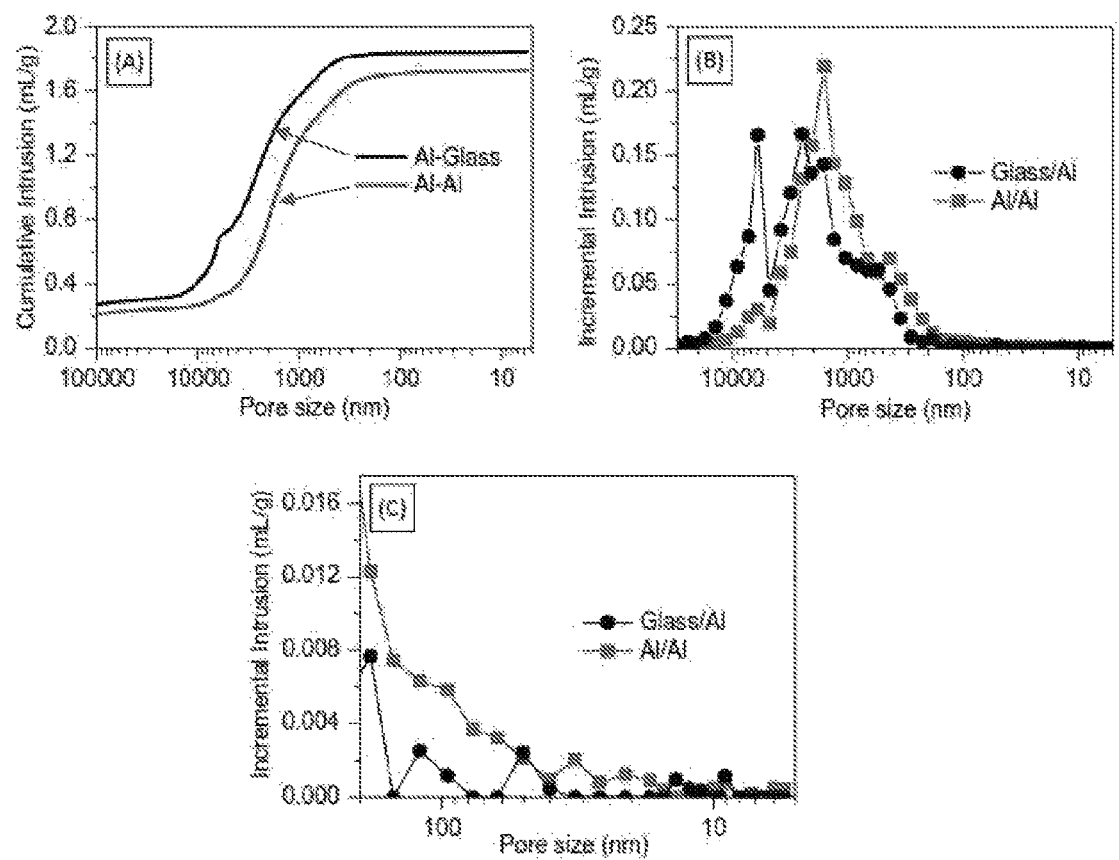

FIG. 18: Mercury intrusion porosimetry results of CCD Glass/Al 1.0 mm membrane and Al/Al 1.0 mm membrane. (A) Cumulative intrusion volume vs. pore size; (B) incremental intrusion volume vs. pore size; (C) incremental intrusion volume vs. pore size within small pore size range.

Figure 19:
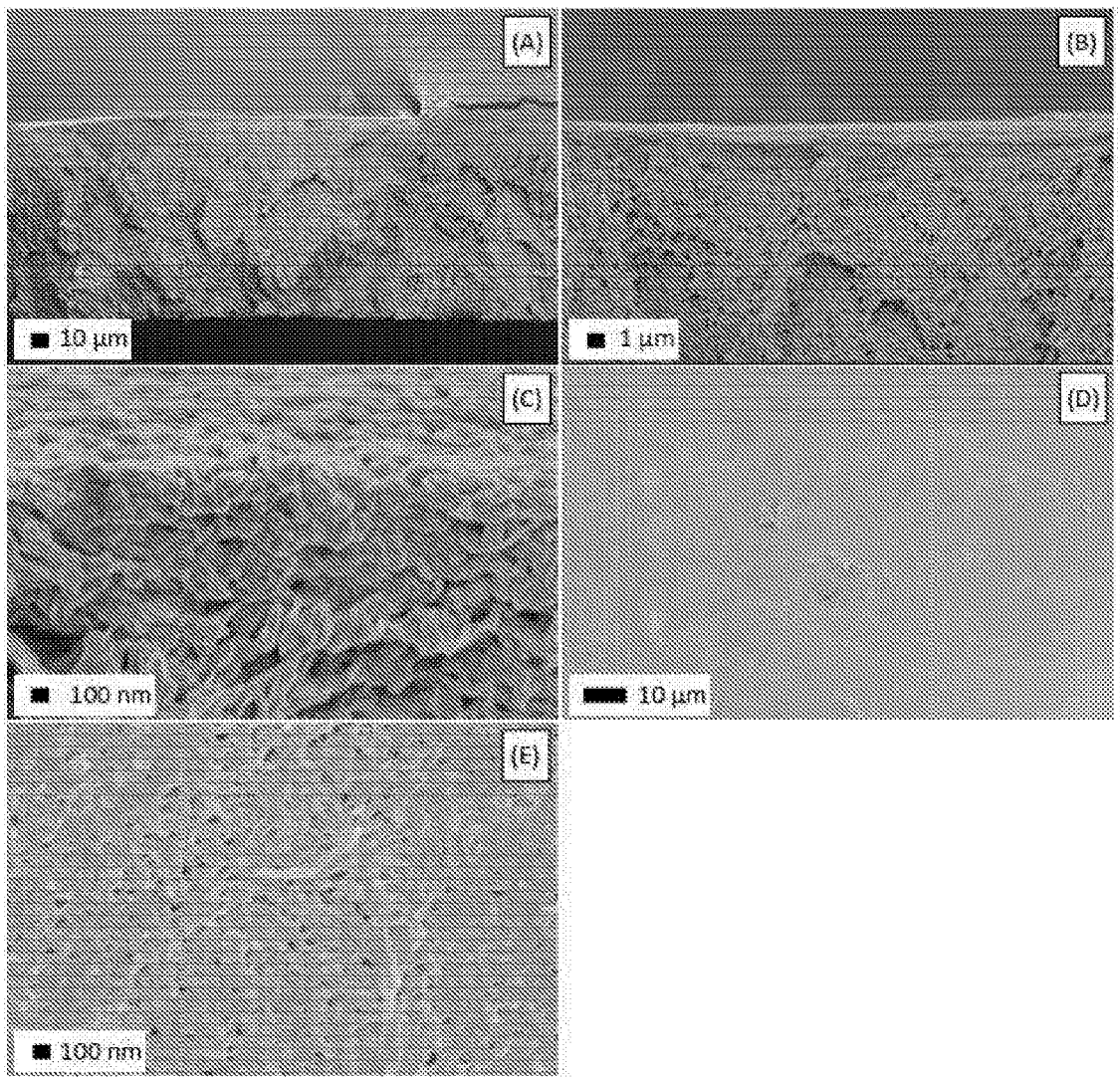

FIG. 19: SEM images of a CCD Al/Al 0.3 mm PVDF membrane after the abrasion test for 2 weeks. (A) The cross-sectional overview; (B) a cross-sectional view close to the separation layer; (C) high magnification image of the top separation layer; (D) overview of the membrane surface; and (E) high magnification image of the surface.

Figure 20:
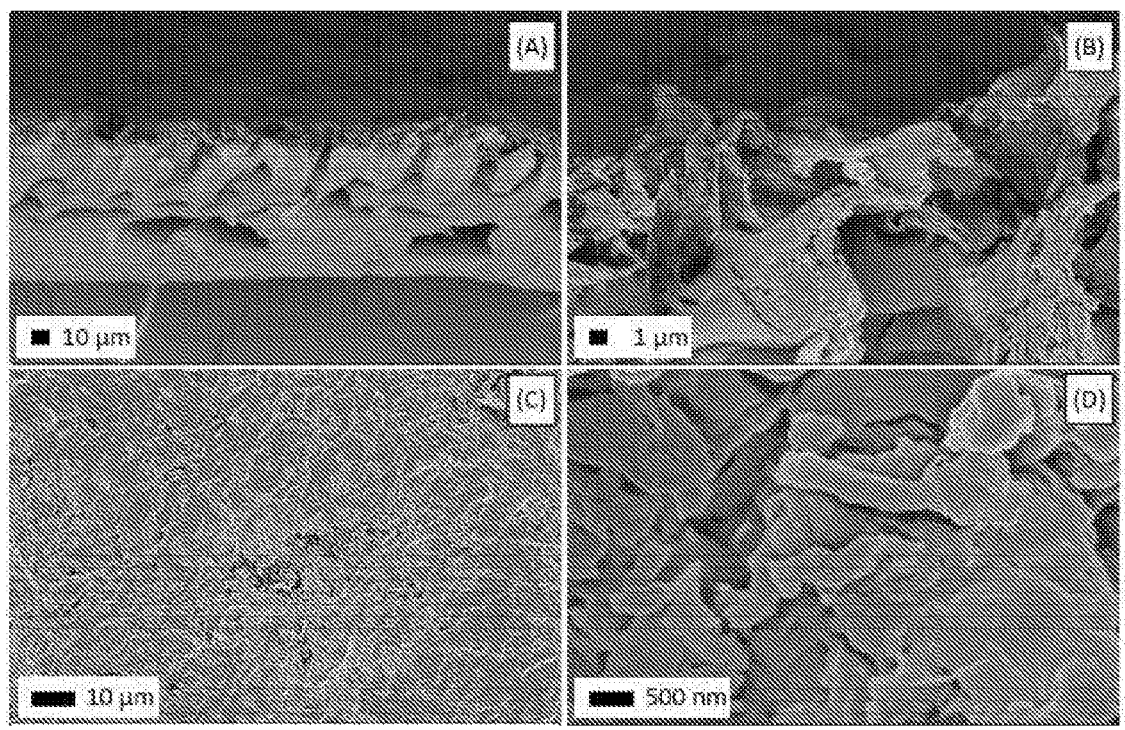

FIG. 20: SEM images of a NIPS DMSO 0.3 mm PVDF membrane after the abrasion test for 2 weeks. (A) The cross-sectional overview; (B) a cross-sectional view close to the separation layer; (C) overview of the membrane surface; and (D) a closer view on the surface.

Figure 21:
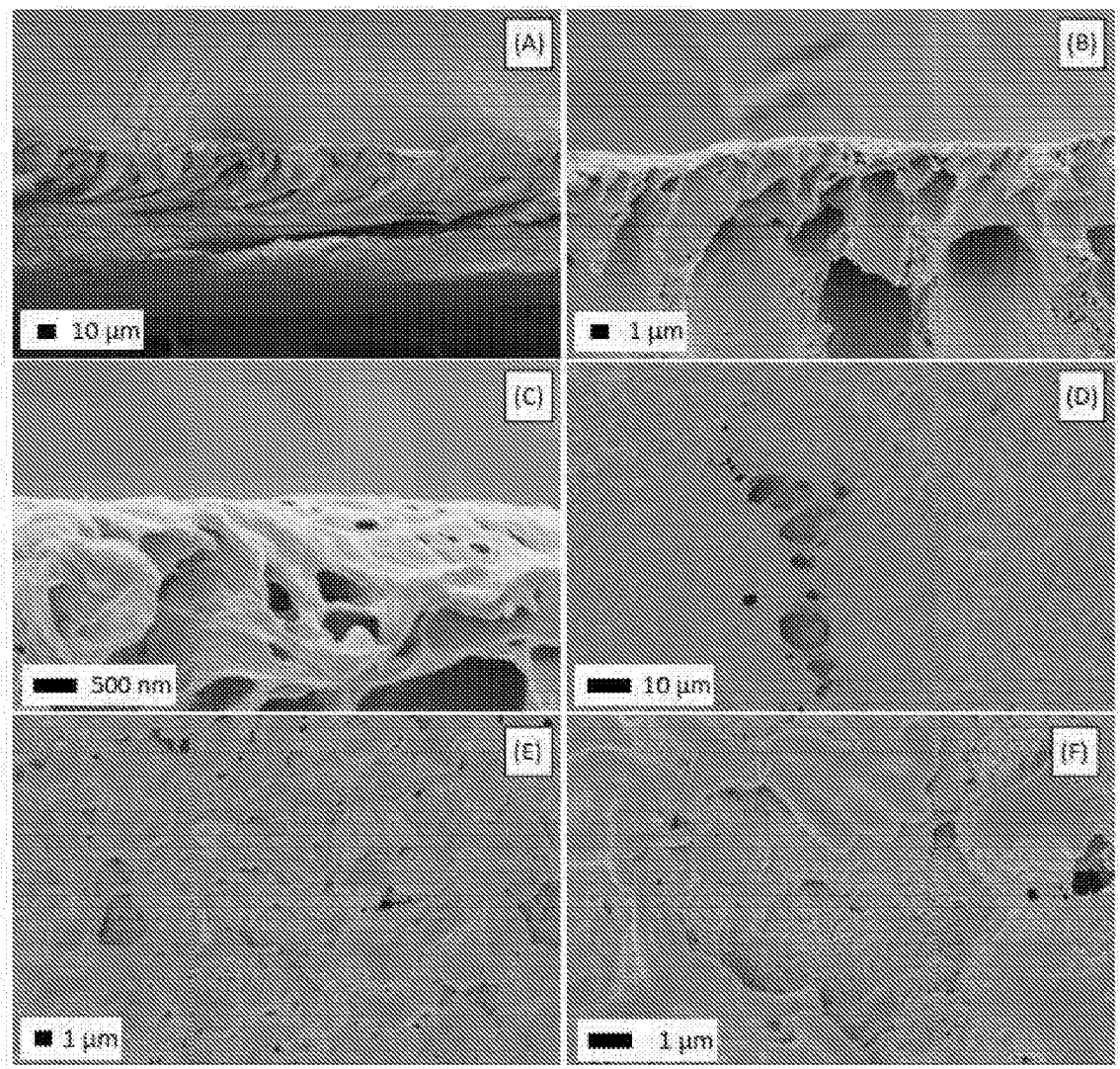

FIG. 21: SEM images of a NIPS NMP 0.3 mm PVDF membrane after the abrasion test for 2 weeks. (A) The cross-sectional overview; (B) a cross-sectional view close to the separation layer; (C) high magnification image of the top separation layer; (D) overview of the membrane surface; (E) a closer view on the surface; and (F) high magnification image of the surface.

Figure 22:
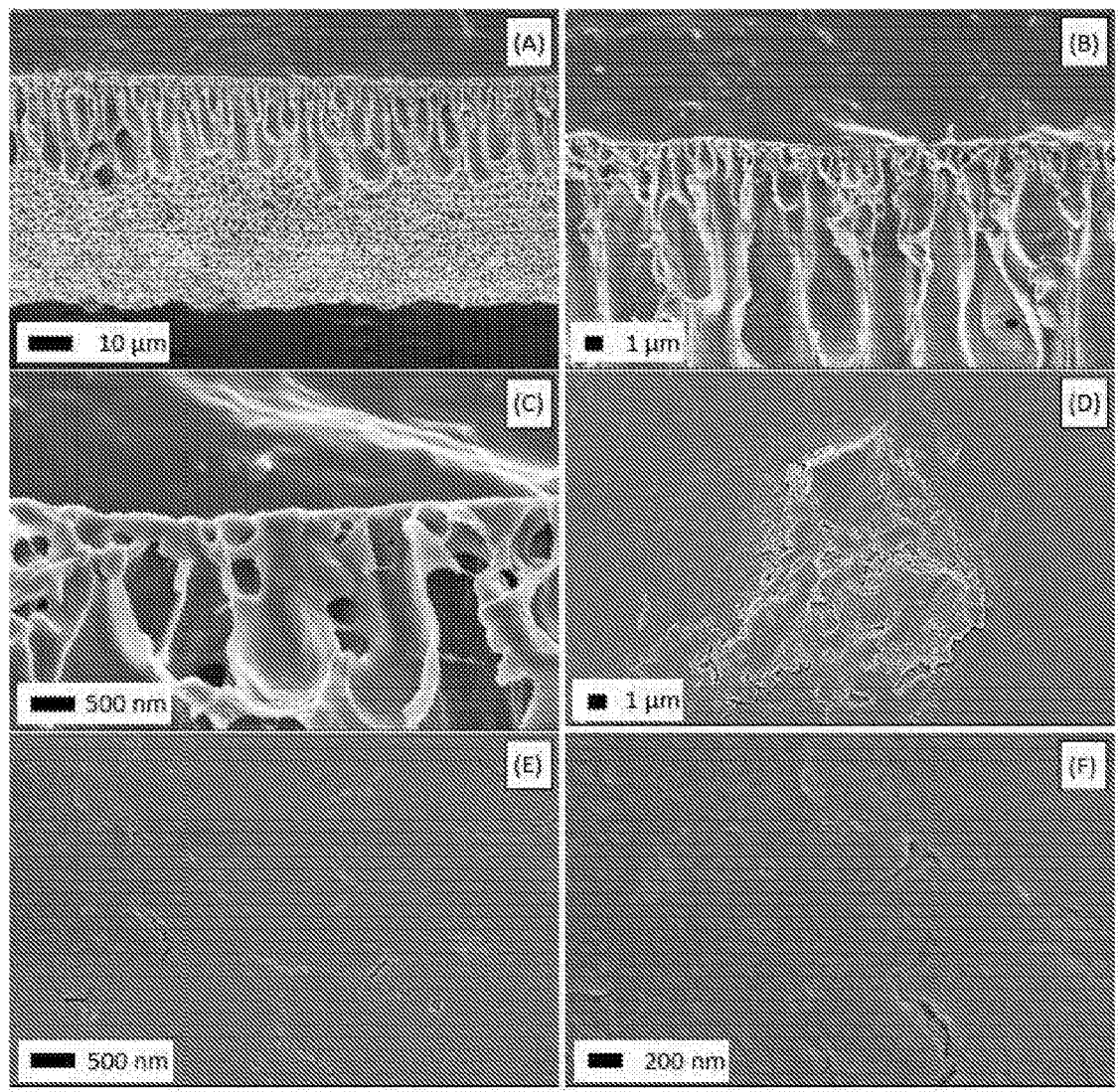

FIG. 22: SEM images of a NIPS DMAc 0.3 mm PVDF membrane after the abrasion test for 2 weeks. (A) The cross-sectional overview; (B) a cross-sectional view close to the separation layer; (C) high magnification image of the top separation layer; (D) overview of the membrane surface; (E) a closer view on the surface; and (F) high magnification image of the surface.

Figure 23:
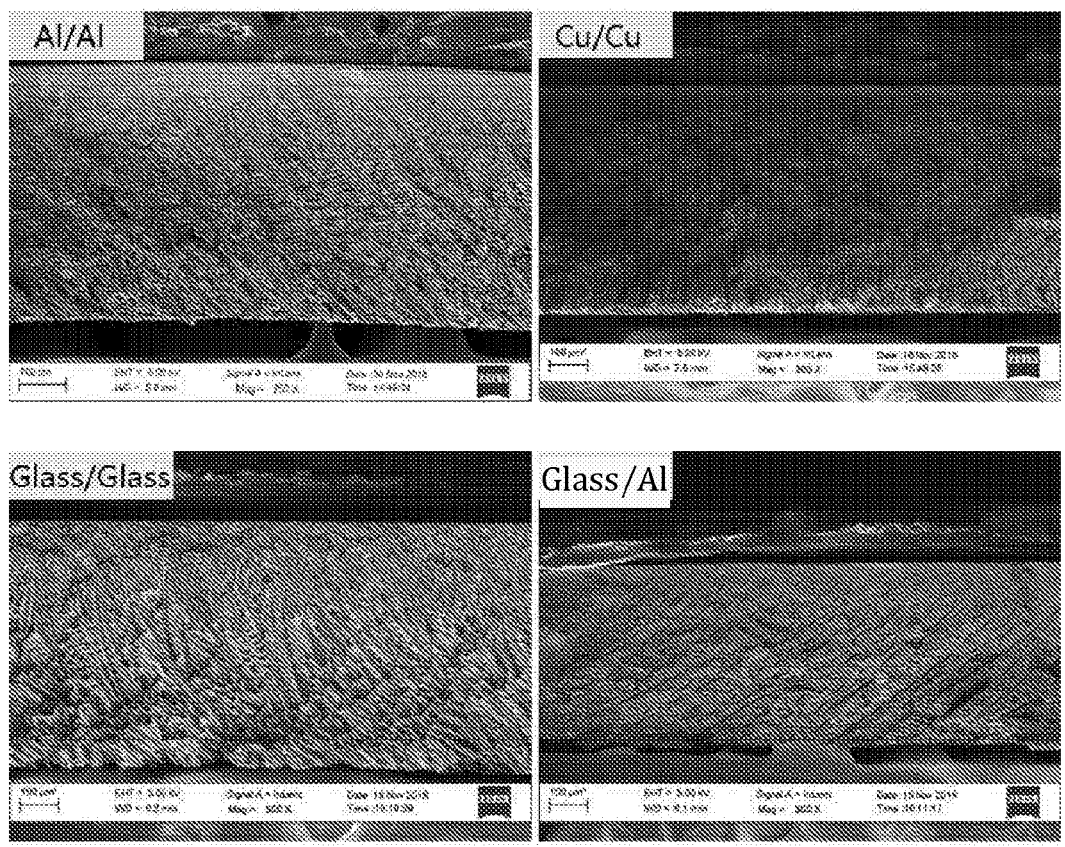

FIG. 23: Cross-sectional overview SEM images of the 1 mm thick CCD PES membranes prepared by using four different combinations of casting plate and cooling plate.

Figure 24:
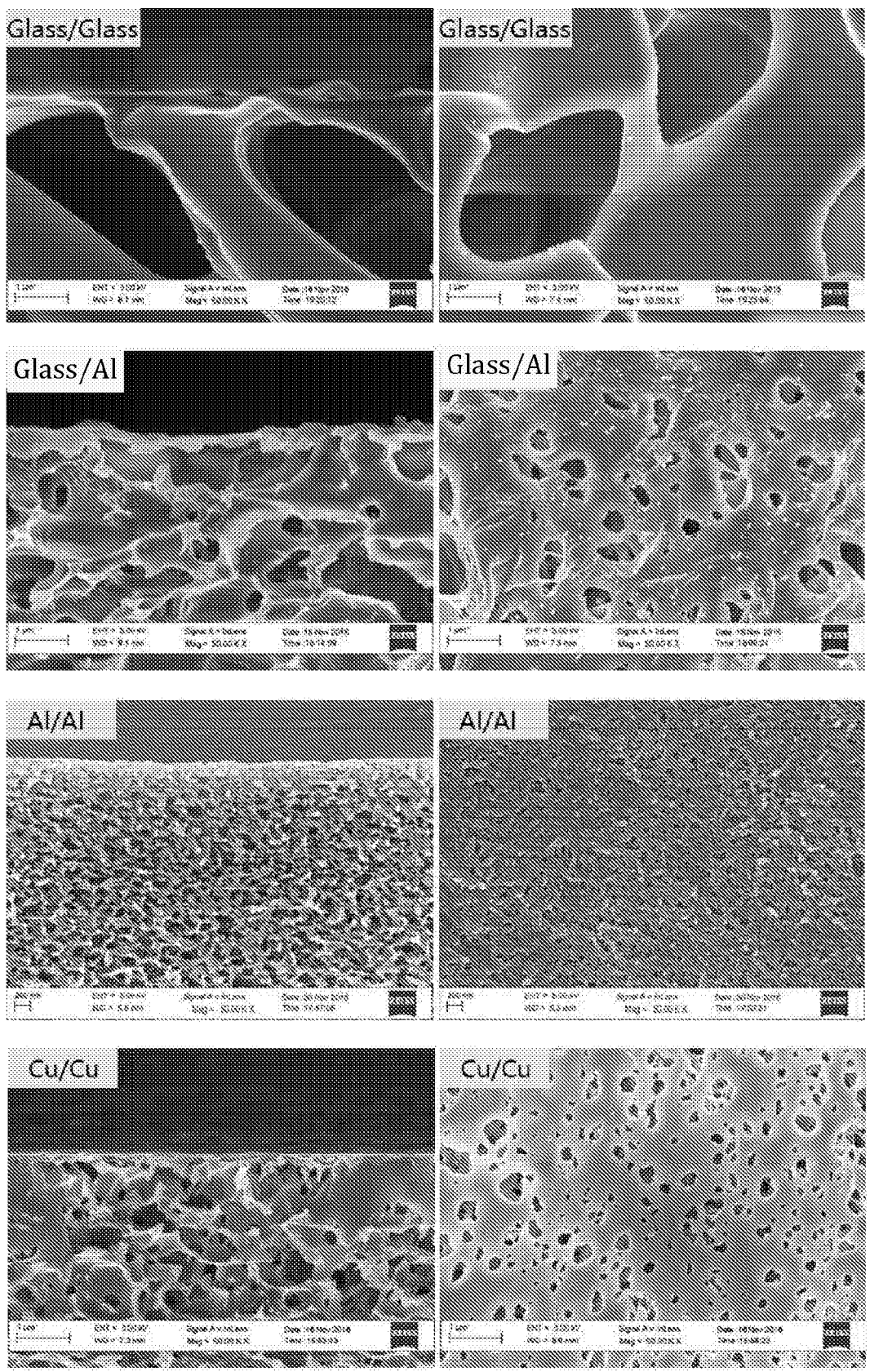

FIG. 24: SEM images of close cross-sectional view (left) and surface (right) of the separation layers of the 1 mm thick CCD PES membranes prepared by using different combinations of casting plate and cooling plate.

MATERIALS AND METHODS

Chemicals

Commercial polyvinylidene fluoride (PVDF, Kynar® K-761, Mw=440,000 Da, ρ=1.79 g/cm³) was purchased from Elf Atochem and was dried at 80° C. for 24 hours before use. Poly(ethylene glycol) (PEG-400, Mw=400 kDa), bovine serum albumin (BSA), DMSO (DMSO), dimethylacetamide (DMAc), N-methyl-2-pyrrolidone (NMP), ethanol, hexane, SiC, were purchased from Sigma-Aldrich, UK and were used as received.

Scanning Electron Microscopy (SEM)

The morphologies of the membrane samples including separation layer, supporting layer and cross section were observed by SEM (LEO Gemini 1525 FEGSEM, Tokyo, Japan). The wet membranes were first immersed in ethanol for 30 minutes in order to replace all the water inside the pores, and then were fractured in liquid nitrogen to obtain the cross-sectional samples. The prepared samples were coated with gold of 10 nm thickness using an Emitech K550 ion sputtering device prior to SEM observation Fourier Transform Infrared Spectroscopy (FT-IR)

The structure of PVDF membranes was analysed by using a Fourier Transform Infra-Red (FTIR) spectrometer (Perkin Elmer, Spectrum One equipped with an attenuated total reflection (ATR) attachment). The samples were placed on the sample holder and all spectra were recorded in the wavenumber range of 4000-600 $cm^{-1}$ by accumulating 8 scans at a resolution of 2 $cm^{-1}$.

Differential Scanning Calorimetry (DSC)

The melting behaviour of each membrane sample was characterized by DSC (Pyris-1, Perkin Elmer, Beaconsfield, UK) and was used to determine the percentage crystallinity of PVDF in the membranes. The samples were heated from 20° C. to 220° C. at 10° C./min. The percentage crystallinity of PVDF in each membrane sample was calculated by the equation shown below:

$$\% \text{ Crystallinity} = \frac{\Delta Hm}{\Delta Hm^0} \times 100\%$$

where $\Delta Hm$ is the heat associated with melting (fusion) of the membrane and is obtained from the DSC thermograms, $\Delta Hm^0$ is the heat of melting if the polymer was 100% crystalline and is 104.7 J/g for PVDF.

X-Ray Diffraction (XRD)

The crystalline structure of all the membrane samples were determined using an X-ray diffractometer (X'Pert PRO Diffractometer, PANalytical) with a source intensity of 40 kV/40 mA. All the samples were characterised in the scanning range of 5°<2θ<50°.

Water Contact Angle Measurement

The surface hydrophilicity of the membranes was studied by measuring the water contact angle on the surfaces of both separation layer and supporting layer. The measurement was conducted at room temperature using a ramé-hart Standard Goniometer (Model 250, ramé-hart instrument co., USA). In the test, 4 μL of deionised water droplets were deposited onto the membrane surfaces of each sample. The image was taken and the contact angle was measured from shape analysis by DROPimage Advanced software. At least five independent readings were taken at different sites on each membrane sample and the average value was reported.

Pure Water Permeation Test

In order to evaluate the membrane permeability, pure water permeation tests were conducted using a 300 mL dead-end filtration cell (HP4750 Stirred Cell, Sterlitech Corporation, USA). The PVDF membrane samples prepared by the CCD method were tested directly at 1 bar without any pre-treatment such as membrane compaction at higher pressure. This is because the membrane samples prepared by such method possessed excellent mechanical strength and could withstand at high pressure without any flux decline being observed. On the other hand, the membrane samples prepared by the conventional NIPS method were compacted at a pressure of 2 bar for 30 min prior to sample collection at 1 bar. The permeance of the membrane was calculated based on the equation shown below:

$$J = \frac{V}{A \times t}$$

where J is the water flux, V is the permeate volume, A is the effective membrane area, t is the time of permeate collection.

BSA Fouling Test

The fouling test was conducted using a cross-flow filtration cell (CF042 Crossflow Assembly, Sterlitech Corporation, USA) and BSA was employed as a model protein to investigate the fouling resistance of the membrane samples. In the test, 1.0 g/L BSA aqueous solution was circulated through the feed side of the filtration cell, and the weight of permeate was recorded by a computer in real time.

Gas-Liquid Displacement Porosimetry

In this work, the membrane pore size and pore size distribution were characterized by the gas-liquid displacement method using POROLUX 1000 (POROMETER nv, Belgium). The wet membrane was cut into certain size and wetted with a specific wetting liquid, POREFIL™ (POROMETER nv, Belgium, surface tension of 16 mN/m). In the test, the pressure of the testing gas $N_2$ was increased from 0 to 34.5 bar step by step to replace the wetting liquid inside the membrane pores. At each step, both the pressure and the flow have to be stabilized within ±1% for 2 s before the data was recorded. The relevant pore size corresponding to each operating pressure can be calculated based on the Young-Laplace equation:

$$d = \frac{4\gamma \cos\theta}{\Delta P}$$

where d is the diameter of the pores behaving as gas paths and contributing to the gas flow at each operating pressure; γ is the surface tension of the wetting liquid, which is 16 mN/m; θ is the contact angle of the wetting liquid on the membrane surface, which is 0°; ΔP is the specific operating pressure.

Only the neck size of open pores could be measured using this method and for each sample, the mean flow pore (MFP) diameter and pore size flow distribution were obtained.

Mercury Intrusion Porosimetry

For some samples, mercury intrusion data were also collected at absolute pressure ranging between $1.38 \times 10^3$ and $2.28 \times 10^8$ Pa (0.2-33,500 psia) (Micromeritics Autopore IV) with an equilibration time of 10 s and assuming a mercury contact angle of 130°. The flat sheet membranes were cut into sections of approximately 4 mm in diameter prior to mercury intrusion analysis.

Mechanical Testing

Mechanical properties of the membranes were tested according to American Society for Testing and Materials (ASTM) D882 using a tensile testing machine, Lloyd EZ 50. The samples were cut into 10 mm wide parts and the thickness was measured with micrometre. Each sample was initially fixed at a gauge length of 50 mm and was then stretched at a constant rate of 10 mm/min; the corresponding tensile force was recorded by a transducer. The elongation ratio and tensile strength at the breaking point and Young's modulus were measured. At least five samples were tested for each membrane and the averaged value was recorded.

Abrasion Testing

In this work, the abrasion test was carried out using the same dead-end filtration cell as in the water permeation test. A 2000 mg/L silicon carbide suspension was prepared and used to simulate the accelerated abrasion condition in wastewater treatment. The wet membrane sample was placed in the filtration cell, and 300 mL of the SiC suspension was filled and then stirred at 400 RPM for 2 weeks. Subsequently, the membrane sample was washed under ultrasound for 10 min to remove all debris worn away from the membrane during the test. Then the change in the membrane structure was observed using SEM.

Calculation of Temperature Profile and Cooling Rate

Transient temperature profiles across casting polymer films and the cooling rates at fixed positions in the casting film were calculated by the commonly used finite difference method with the explicit scheme. The 1-D heat conduction models for the scenarios involved in this research were set as below.

1) Cooling with a pre-cooled plate

The setting of the initial conditions for the calculation of thermal conduction and temperature profile under the circumstance of cooling with a pre-cooled cold plate is illustrated in FIG. 1

The boundary of the cold plate was fixed at −30° C., as it was continuously cooled by a freezer. A 20 mm air gap was used to allow the temperature of the top surface of the polymer casting film to change, and the boundary was fixed at 20° C. The thickness of the air gap has a little influence on the final temperature of the top surface of the polymer film, but basically produces no difference within the time of interest.

Heat conduction in the layers of different materials was deemed as heat diffusion along 1-D grids, on which points with an interval ($\Delta x$) of 5 μm were used to solve the heat conduction equation numerically:

$$\frac{\partial T}{\partial t} + \kappa \frac{\partial^2 T}{\partial x^2}$$

where T is the temperature, t is the time, x is the distance and K is the thermal diffusivity. The thermal diffusivity k is defined as $$\kappa = \frac{k}{\rho c_p}$$

where $\rho$ is density, $c_p$ heat capacity and k thermal conductivity.

Inside each homogeneous material layer, heat conduction is calculated by $$T_i^{n+1} = T_i^n + \kappa \Delta t \left( \frac{T_{i+1}^n - 2T_i^n + T_{i-1}^n}{(\Delta x)^2} \right)$$

and at the interface between different material layers, heat conduction is calculated by $$T_i^{n+1} = T_i^n + \frac{\kappa_{i-1} \Delta t}{(\Delta x)^2} T_{i-1}^n - \left( \frac{\kappa_{i-1} \Delta t}{(\Delta x)^2} + \frac{\kappa_i \Delta t}{(\Delta x)^2} \right) T_i^n + \frac{\kappa_i \Delta t}{(\Delta x)^2} T_{i+1}^n$$

Here i is the position on the grid, and n is the number of the time step $\Delta t$, which is set $$2k\Delta t \leq (\Delta x)^2$$

to meet the criteria of stability for the calculation.

2) Cooling by immersing into liquid nitrogen or pre-cooled hexane

In these two cases, same algorithm was used, but the grids and boundary conditions were different, as shown in FIG. 2.

To simplify the calculation and to keep the calculating time within a manageable duration, and also due to the lack of available literatures, it is assumed that the thermal diffusivities in all layers are constant within the temperature range of interest, and it does not change in the casting film even if the film is turned from liquid to solid. This will of course lead some inaccuracy but will not alter the trends shown in the results. That is because within such a relatively short temperature range (from 20° C. to −30° C., except the case of liquid nitrogen, in which the lower temperature range from −30° C. to −196° C. is no longer interested), the change in the thermal diffusivity is usually very small. And for common solvents and polymer, the thermal diffusivity usually does not change significantly when phase transformation happens. The thickness change of the casting film during the cooling process was also not taken into account, since the change was small and should not lead significant effects to the temperature profiles.

Example 1—Membrane Preparation

PVDF flat sheet membranes with highly asymmetric and self-assembled ordered structure were produced by a combined crystallization and diffusion (CCD) method. The PVDF dope solutions were prepared by dissolving PVDF powder (20 wt. %) in DMSO at 80° C. or in NMP and DMAc at room temperature, and then was left in the oven at 80° C. overnight to remove bubbles. The dope solution was then casted on a casting plate of certain thickness and was then unidirectionally cooled to a pre-determined temperature in two ways. Referring to FIG. 3, unidirectional cooling method 1 involves transferring the casting plate onto a pre-cooled cold plate (−30° C., detected by an infrared thermometer) on a freezing board. Unidirectional cooling method 2 involves immersing the casting plate into a pre-cooled liquid such as hexane (−15° C., detected by an infrared thermometer) or liquid nitrogen (−196° C.). For method 1, the materials of the cold and casting plates were aluminium or glass to realize different thermal conductions and thus different cooling rates; for method 2, a 1 cm thick glass casting plate was used to ensure fast cooling from only one side. After complete quenching, the frozen casting film was immersed in iced water to leach the solvent out. The water was changed regularly to remove the residual solvent. Apart from the materials of the plates, the casting thickness was varied in order to investigate their effects on the membrane morphology and properties.

Modified PVDF membranes were also prepared with the same method, except the polymer solution is blended with PEG-400, with the PEG:PVDF:DMSO mass ratio of 1:4:16.

Conventional non-solvent induced phase separation (NIPS) method was employed to prepare PVDF membranes as the control samples using DMSO, DMAc and NMP as the solvent and deionized water as the non-solvent. The polymer solution was cast on a glass plate at room temperature and then immediately immersed into water bath. The fabricated membrane was then kept in deionised water, which was changed frequently to remove the residual solvent before all the characterisations.

The preparation conditions of each sample are summarised in Table 1 below:

Apparently in the case of Glass/Glass and Glass/Al samples, the slow cooling rates would have produced bigger initial DMSO crystallites than the Al/Al sample, and the temperature gradients in the cold-end region are also much less steep than the latter case, which would have resulted in slower polymer diffusions. Both factors would contribute to the formation of bigger pore size in Glass/Glass and Glass/Al samples, and it is difficult to tell which factor is more important during the membrane formation process.

However, those cases using pre-cooled hexane and liquid nitrogen clearly show the importance of polymer diffusion. When immersed into the hexane and liquid nitrogen, the polymer film underwent much faster cooling than the Al/Al case, and the initial DMSO crystallites in principle should be smaller than the Al/Al case. However, the pore sizes in both cases are even bigger than the Glass/Glass case, as shown in FIG. 4(J) and 1(K). In both cases, although a temperature gradient similar to or larger than the Al/Al case was applied,

TABLE 1

Casting conditions for the preparation of flat sheet membranes according to CCD and NIPS procedures

| | Sample | solvent | Casting Thickness | Casting Plate | Cold plate/Cooling Condition |
|---|---|---|---|---|---|
| CCD pure PVDF membranes | Glass/Glass | DMSO | 1 mm | 6 mm Glass | 6 mm Glass plate at −30° C. |
| | Glass/Al | DMSO | 1 mm | 6 mm Al | 6 mm Glass plate at −30° C. |
| | Al/Al 1.0 mm | DMSO | 1 mm | 6 mm Al | 6 mm Al plate at −30° C. |
| | Al/Al 0.5 mm | DMSO | 0.5 mm | 6 mm Al | 6 mm Al plate at −30° C. |
| | Al/Al 0.3 mm | DMSO | 0.3 mm | 6 mm Al | 6 mm Al plate at −30° C. |
| | Al/Al 0.1 mm | DMSO | 0.1 mm | 6 mm Al | 6 mm Al plate at −30° C. |
| | Hexane | DMSO | 1 mm | 10 mm Glass | Hexane bath at −15° C. |
| | Liquid $N_2$ | DMSO | 1 mm | 10 mm Glass | Liquid nitrogen (−196° C.) |
| | Al/Al NMP | NMP | 1 mm | 6 mm Al | 6 mm Al plate at −30° C. |
| | Al/Al DMAc | DMAc | 1 mm | 6 mm Al | 6 mm Al plate at −30° C. |
| CCD modified PVDF-PEG membranes | Glass/Al | DMSO | 1 mm | 6 mm Al | 6 mm Glass plate at −30° C. |
| | Al/Al 0.3 mm | DMSO | 0.3 mm | 6 mm Al | 6 mm Al plate at −30° C. |
| NIPS pure PVDF membranes | DMSO 1.0 mm | DMSO | 1.0 mm | 6 mm Glass | N/A |
| | DMSO 0.5 mm | DMSO | 0.5 mm | 6 mm Glass | N/A |
| | DMSO 0.3 mm | DMSO | 0.3 mm | 6 mm Glass | N/A |
| | DMAc 0.3 mm | DMAc | 0.3 mm | 6 mm Glass | N/A |
| | NMP 0.3 mm | NMP | 0.3 mm | 6 mm Glass | N/A |

Example 2—Membrane Structure and Properties

Effect of Cooling Profile

FIG. 4(A) shows the calculated temperature changes at the position of 10 μm from the cold-end interface of the polymer film, and FIG. 4(B) shows the temperature profiles within 200 μm from the cold end of the cast films after cooling for 1 second.

FIG. 4(C) gives a cross-sectional scanning electron microscopy (SEM) image of the final membrane prepared by using a glass cold plate and a glass casting plate (denoted as Glass/Glass). The prepared membrane has an asymmetric structure with gradually opened micro-channels, which have been commonly observed in freeze-drying process when unidirectional cooling is applied due to the Mullins-Sekerka instability (8, 14, 15). In addition, pores smaller than 1 μm can be seen at the cold end edge and surface (FIG. 4(D & G)). With a faster cooling rate realised by employing a glass cold plate and an aluminium casting plate (denoted as Glass/Al), the pore size however can be quickly reduced to about 100 nm, as shown in FIG. 4(E & H). With an even faster cooling rate, realised by an aluminium cold plate and an aluminium casting plate (denoted as Al/Al), the pore size can be dramatically reduced to 30-50 nm, as shown in FIG. 4(F & I).

the polymer film at the cold end (10 μm from the cooling interface, for example) was cooled down to less than 7° C. within 0.001 s and the polymer film would be frozen almost instantly, leaving virtually no time for polymer to diffuse. Taking the diffusivity of polymer solute in liquid DMSO as $1 \times 10^{-9}$ m$^2$/s, which is a typical value for polymer diffusion in solvents, the maximum distance that the polymer can travel within 0.001 s could be calculated to be only 1.4 μm, implying there was essentially no meaningful polymer diffusion occurred. As a consequence, the initial DMSO crystallites were allowed to agglomerate to form bigger grains resulting in big pores in the final membranes.

Effect of Solvent

If the sequence of phase separation and solvent crystallisation is altered, different results are obtained. In two other Al/Al cooling cases (−30° C.), N-methyl-2-pyrrolidone (NMP) and dimethylacetamide (DMAc) were used as the solvent, whose melting points are considerably lower than room temperature (−24° C. and −20° C., respectively), and deliberately let phase separation happen prior to the crystallisation of the solvent due to the reduction of solvent power. In both cases, due to the precipitated solid polymer blocks that lead steric hindrance effect to lateral solvent crystallisation, the formation of micro-channels was prevented, and the membranes have a quite homogenous structure, which are commonly observed in TIPS membranes. In both membranes, a thick, dense separation layer was formed at the cold side due to prolonged diffusion times. Since the dense separation layer was formed before solvent crystallisation, no solvent crystallites are expected to present in this layer, and in fact no visible pores were found in this layer under high-resolution SEM (FIGS. 5 & 6).

Referring to FIG. 5, the NMP Al/Al membrane shows a sponge-like structure in the supporting layer, and no micro-channels were formed. This is due to the low melting point at −24° C., which is 46° C. lower than the room temperature. Within this large temperature difference, the PVDF solution had phase separated long before the crystallisation of NMP, and the formed polymer blocks would prohibit the formation of micro-channels during later NMP crystallisation. However, polymer diffusion from the hotter part to the cold end still happens, and due to the longer available time for diffusion, the denser separation layer in the NMP Al/Al membrane is much thicker than the DMSO Al/Al membrane, reached 5 μm. Since the formation of the separation layer is earlier than NMP crystallisation, no NMP crystallites presented in the separation layer and therefore there were no nano-scale pores from NMP crystallites formed. This thick and dense separation layer showed a very low pure water flux of 6.5 LMH bar$^{-1}$, and no pores larger than 18.6 nm were detected with gas-liquid displacement porosimetry.

Pore Size Distribution and Flux

The CCD pure PVDF membranes made from DMSO solution show very narrow pore size distributions (FIG. 7) and superior permeation performances compared with NIPS membranes. FIG. 7 shows typical pore size distributions of CCD PVDF membranes and NIPS PVDF membranes. All measurements used same pressure steps to ensure fair comparisons. FIG. 7(A) shows a CCD Glass/Glass 1 mm sample, which has a sharp peak at 334 nm with a percent flow of 97.0%; FIG. 7(B) shows a CCD Glass/Al 1 mm sample, which has a sharp peak at 103 nm with a percent flow of 98.3%; and FIG. 7(C) shows a CCD Al/Al 1 mm sample that has a peak at 40 nm with a percent flow of 72.0%. On the other hand, the membranes prepared by the NIPS method showed much broaden pore size distributions. The NIPS DMSO 1 mm sample showed a maximum percent flow of 18.9% at 38 nm (FIG. 7(D)), the NIPS DMSO 0.5 mm sample showed a maximum percent flow of 16.4% at 48 nm (FIG. 7(E)), and the NIPS NMP 0.3 mm sample showed a maximum percent flow of only 8.4% at 57 nm (FIG. 7(F)). The NIPS DMAc samples could not be measured, either due to the extremely low pore numbers, or because the pores are smaller than the limit of the equipment (18 nm).

Table 2 summarises the permeation characteristics of these membranes and compare them with some commercial membranes from major manufacturers.

TABLE 2

Permeation characteristics of CCD PVDF membranes, NIPS PVDF membranes and some commercial PVDF membranes

| Membrane material | Membrane Type | | Pure water flux (LMH bar$^{-1}$) | Pore size (nm) |
|---|---|---|---|---|
| Pure PVDF | CCD membranes [a] | Glass/Glass 1.0 mm | 10998 ± 407 | 345 ± 26 |
| | | Glass/Al 1.0 mm | 5017 ± 547 | 119 ± 10 |
| | | Al/Al 1.0 mm | 861 ± 78 | 45 ± 3 |
| | | Al/Al 0.5 mm | 570 ± 37 | 29 ± 3 |
| | | Al/Al 0.3 mm | 608 ± 82 | 30 ± 9 |
| | | Al/Al 0.1 mm | 486 ± 28 | 38 ± 11 |
| | NIPS membranes [a] | DMSO 1.0 mm | 6.9 ± 3.4 | 35 ± 7 |
| | | DMSO 0.5 mm | 6.1 ± 1.2 | 45 ± 9 |
| | | DMSO 0.3 mm | 9.3 ± 5.8 | 54 ± 12 |
| | | NMP 0.3 mm | 2.3 ± 2.6 | 61 ± 11 |
| | | DMAc 0.3 mm | 2.7 ± 0.5 | <18 |
| Modified PVDF | PVDF-PEG CCD membrane [a] | Glass/Al 1.0 mm | 6649 ± 675 | 162 ± 1 |
| | | Al/Al 0.3 mm | 1384 ± 112 | 38 ± 2 |
| | Commercial membranes [b] | DOW | 40-120 | 30 |
| | | QUA | 20 | 40 |
| | | KOCH PURON ™ | 100 | 30 |
| | | GE ZeeWeed 1500 | 135 | 20 |
| | | TORAY | 30(MBR conditions) | 80 |
| | | Pall | >3000 | 200 |
| | | Pall | >8200 | 450 |
| | | TriSep TM10 | 90 | 200 |
| | | Hydranautics HYDRAcap ® | 34-110 | 80 |

[a] Sample names are ended with casting thickness; pore sizes were determined by the gas-liquid displacement method.
[b] Pore sizes are nominal pore sizes provided by the manufacturer; water fluxes were converted from product brochure of membrane modules, but operation pressures and other conditions are unclear.

Referring to FIG. 6, the DMAc (melting point at −20° C.) Al/Al membrane also shows a homogeneous but porous supporting layer and a denser top layer. This membrane broke apart when the crystallisation of DMAc was finished and only debris were obtained, which may be due to the damaging shape of DMAc crystal grains that cuts the membrane. The SEM images show some deep cracks formed at the air side of the membrane. Permeation characteristics such as pore size and pure water flux were therefore not obtained for this membrane.

Table 2 shows that the pure water permeation fluxes of the CCD membranes are substantially higher than the commercial membranes. Especially for the MF membranes with pore sizes of 119 nm and 345 nm, the pure water flux reached stunning 5017 and 10998 LMH bar$^{-1}$, respectively. Considering the fact that most commercial membranes use modified PVDF to increase surface hydrophilicity, to make fair comparison, pure PVDF membranes were also prepared using polymer solutions of same PVDF concentration but via conventional NIPS method. The NIPS pure PVDF membranes showed pure water fluxes of less than 10 LMH bar$^{-1}$ (Table 2), which are two orders of magnitude lower than the CCD Al/Al membrane with similar pore size.

Separate from the data presented in Table 2, a CCD PVDF membrane prepared from a DMSO dope solution cast on a 6 mm thick glass substrate at a thickness of 0.5 mm and unidirectionally cooled in hexane provided at −12° C. had an average pore size of 950 nm±120 nm and a pure water flux of 14062±638 LMH/bar.

Casting Thickness

A very interesting correlation between the permeation flux and membrane thickness was found in the CCD Al/Al membranes, i.e. the flux increases as the thickness increases. Table 2 also gives the permeation characteristics of the Al/Al membranes with different casting thicknesses. It can be seen that the pore size does not show significant changes with the thickness, but the flux increase from 485.7 LMH bar$^{-1}$ for the 100 μm membrane gradually to 860.6 LMH bar$^{-1}$ for the 1 mm membrane. This trend can be attributed to different PVDF diffusion rates during the unidirectional cooling. It can be calculated that by changing the thickness of casting film, the cooling rate at the cold end was almost not affected during the time of interest (FIG. 8(A)). However, the temperature gradient increases when the thickness reduces (FIG. 8(B)), which would provide a larger driving force for the polymer solute to diffuse to the cold end and thus form a denser and thicker separation layer, leading to a slower permeation flux. The changes in the thickness and the density of the separation layer are clearly revealed by SEM images (FIG. 8(C-F)), which agree very well with the trends of the pure water flux and the temperature gradient. As a comparison, such a trend has not been observed in PVDF membranes also using DMSO as the solvent but via the conventional NIPS method.

Modification of Membranes

The permeation flux of the CCD membranes can be further enhanced by improving the hydrophilicity of the pores, since pure PVDF is widely considered to be a hydrophobic material (1, 2). Table 2 above also lists the permeation characteristics of two typical modified CCD PVDF microfiltration and ultrafiltration membranes, which were improved simply by blending a hydrophilic polymer polyethylene glycol (PEG) with PVDF. The improvement is especially evident for the Al/Al ultrafiltration membrane whose pure water permeation flux increased from 500-600 to about 1400 LMH bar$^{-1}$ after modification, whilst the pore size was kept unchanged. Both the modified and unmodified CCD membranes showed significantly higher fluxes than commercial PVDF membranes (which normally use modified PVDF) with similar pore size, as depicted in Table 2, suggesting that the CCD PVDF membranes have great potential to replace existing commercial membranes.

Membrane Microstructure

To explore why the CCD method brings such high permeability to the PVDF membranes, the structural features of the CCD pure PVDF membranes were compared with those of the NIPS pure PVDF membranes. FIG. 9 shows clearly the structural features of a CCD Al/Al PVDF membrane prepared with 0.3 mm casting thickness. In this membrane, a thin separation layer is supported by numerous very well arranged micro-channels whose size gradually increases from the separation layer (FIG. 9(A)). The cross section image of the membrane shows clearly a number of tortuous pores in the separation layer, and intensively scattered pores on membrane surface (FIG. 9(B, C)). Furthermore, the supporting layer of the CCD membranes is composed of fully opened and oriented but inter-connected micro-channels, which actually give negligible resistances to water permeation (FIG. 9(D, E)).

By comparison, the NIPS membranes show typical asymmetric structures with a skinned top layer supported by a region of finger-like voids and then a sponge-like layer (FIGS. 10 & 11). Although the skinned top layer of the NIPS membranes is thinner compared to the CCD membranes, only few pores on membrane surface can be observed within a scanned area under SEM (FIGS. 10 & 11), implying a very low surface porosity. On the other hand, the CCD membrane has a very porous separation layer.

Fouling

The NIPS membrane has a largely closed backside and back surface (FIGS. 10 & 11), which would not only contribute to the total transport resistance, but also tends to intensify fouling problem because foulant would accumulate in the supporting layer in real applications. Such foulant accumulation in the supporting layer however can be avoided in the CCD membranes.

Fouling tests with a 1 g L$^{-1}$ bovine serum albumin (BSA) solution reveal that the CCD Al/Al 1.0 mm membranes have improved resistance to fouling, which showed a slow and gradual decline of the permeation flux to 33% of the initial value after being tested for 24 hours (FIG. 12). As a comparison, pure PVDF membranes made by NIPS or TIPS underwent severe fouling very quickly with similar testing conditions (16-19), and frequent cleaning steps are required to restore the productivity of the membranes (Table 3).

TABLE 3

Comparison of cross-flow BSA fouling test results for pure PVDF membranes made by NIPS, TIPS and CCD methods.

| Ref | Membrane preparation method | Experiment | Results |
|---|---|---|---|
| (1) | TIPS | Pure PVDF, 50 nm pore size, | BSA flux decreased from ~80 LMH to ~27 LMH (33.7%) in 2 h. |
| (2) | NIPS | Bare PVDF, 20 nm pore size, BSA 1 g/L | BSA flux decreased to 10%. (Unknown testing time; at 0.05 m$^3$ permeated |
| (3) | NIPS | Pure PVDF, BSA 1 g/L. pore size | BSA flux decreased to 33.5% in 1 h. |
| (4) | NIPS | Pure PVDF, pore size unknown, | BSA flux decreased to <10% in 2.5 h. |
| This work | CCD Al/Al | Pure PVDF, 45 nm, BSA 1 g/L | BSA flux decreased to 64% in 1 h, 59% in 2 h, and |

Mechanical Properties

Fourier transform infrared spectroscopy (FT-IR), X-ray diffraction (XRD), and differential scanning calorimetry (DSC) results show that the CCD pure PVDF membranes are composed of β-phase and γ-phase PVDF crystallites with a crystallinity of around 60% (FIG. 13-15). The tightly connected PVDF grains and grain boundaries are clearly shown under SEM, especially in the supporting layer of the membranes (FIG. 16). This is distinct from the NIPS membranes, in which a large portion of α-phase PVDF presents (FIGS. 13 & 14).

Due to the high crystallinity of PVDF and the absence of α-phase (20-22), the CCD membranes are more rigid compared with conventional NIPS membranes, which is reflected by low elongation ratios at the breaking point (<50% as listed in Table 4, while it is often higher than 100% for commercial NIPS PVDF membranes). The mechanical properties of the CCD membranes are shown in Table 4 below:

TABLE 4

Mechanical properties of the CCD membranes

| Sample name | Al/Al 1.0 mm | Glass/Al 1.0 mm | Glass/Glass 1.0 mm |
|---|---|---|---|
| Maximum Load (N) | 12.0 ± 3.0 | 9.0 ± 2.8 | 8.0 ± 0.8 |
| Elongation at Maximum Load (%) | 47.8 ± 5.9 | 26.3 ± 4.9 | 16.4 ± 6.8 |
| Tensile Strength (Mpa) | 2.4 ± 0.6 | 1.9 ± 0.6 | 1.9 ± 0.2 |
| Young's Modulus (Mpa) | 68.1 ± 12.8 | 75.2 ± 13.1 | 66.5 ± 9.2 |
| Maximum water speed* (m/s) | 23.6 | 20.1 | 18.8 |

It is noted that with a faster cooling rate used during the membrane fabrication process, the membrane shows better mechanical properties: higher fracture load, longer elongation and higher tensile stress. It is reasonable to attribute this trend to the microstructural change in the membrane due to the different cooling rates: with a faster cooling rate, the CCD membrane has smaller micro-channels, and the number of the micro-channel would be larger (this assumption agrees with the proposed membrane formation mechanism and is confirmed by SEM images). With smaller but more micro-channels, the stress would be better distributed in the membrane and the energy would be easier to be dissipated by deformation, and fatal damages would be less likely to happen.

Furthermore, since the CCD membranes show increased fluxes when the thickness increases, excellent mechanical properties and high fluxes can be obtained simultaneously. For example, the CCD Al/Al membranes with 1 mm casting thickness and 1 cm width showed a 12 Newton fracture tensile force in the tensile test (Table 4). This means that such a flat-sheet membrane of dimensions 1×2 m$^2$ (width× length) can handle the drag force produced by flowing water along the length direction with a speed of 23.6 m s$^{-1}$, which is much higher than the practical flow speeds used in real applications (normally less than 6 m s$^{-1}$).

Pressure Resistance

Together with the unique structure of very well oriented micro-channels and gradually changed pore size, the high rigidity helps the CCD membrane to resist high pressures. As an example, the CCD Al/Al membrane with 1 mm casting thickness tested under a high pressure at 35 bar was able to maintain their original thickness (FIG. 17(A,B)). On the contrary, the NIPS membranes were severely compressed after the same test and the thickness was reduced to ⅔ of the original value (FIG. 17(C-E)). The CCD membranes can even withstand high-pressure mercury intrusion porosimetry tests, whereby NIPS membranes cannot handle.

The mercury intrusion results of the Al/Al and Glass/Al membranes show typical cumulative intrusion volume-pore size curves (FIG. 18(A)) similar to those rigid pore structures such as in ceramic membranes, with an overall porosity of about 75-76% and a broaden pore size distribution from around 20 μm to less than 0.1 μm. The gradually increased intrusion volume reflects the gradual change in the pore size from the backside to the top separation layer in the CCD membranes. As expected, the incremental intrusion data (FIG. 18(B)) of the Al/Al membrane reveals a smaller pore size (11 μm) than the Glass/Al membrane (17 μm) at which intrusion starts, which correspond to the openings of the micro-channels on the backside. The average pore size of the Al/Al membrane is also smaller than the Glass/Al membrane. Closer observation of the incremental intrusion results (FIG. 18(C)) shows that the Al/Al membrane has higher pore volume at the pore size range of less than 100 nm than the Glass/Al membrane. These results agree very well with SEM images and gas-liquid displacement porosimetry results, and also agree with the prediction of membrane structure based on the cooling rate.

Abrasion Resistance

The CCD membranes have also shown excellent resistance to abrasion, which is commonly found in practice that shortens the membrane lifetime. After an accelerated abrasion test, the CCD Al/Al membrane could maintain its original pore structure (FIG. 19), whereas NIPS membranes were severely damaged (FIG. 20-22).

With the experimental method employed for the abrasion tests, it is known that the most severe damages occur at the centre part of the membrane (5), therefore all SEM images given here were taken from the centre of the membranes for fair comparison.

For the CCD Al/Al 0.3 mm membrane, it essentially kept the original pore structure in the separation layer and the whole membrane structure after the abrasion test. Although some extent of wearing can be found on the membrane surface, where debris were observed (FIG. 19(D)), the pore size on the surface and in the separation layer were not affected (FIG. 19(C, E)). In the FIG. 19(C), it can be seen that the thickness of the separation layer did not change compared with the untested same type of membrane shown in FIG. 9(C), meaning that the wearing of the membrane under such accelerated test was very slight.

For the NIPS DMSO 0.3 mm membrane, the top separation layer was completely destroyed after the abrasion test. From the SEM images, it can be seen that there were only debris remained at the top layer and the separation layer was gone. For the NIPS NMP 0.3 mm membrane, the extent of wearing is less than the DMSO sample and the top layer still remains, but the top layer has been largely deformed and the pore structure has been completely altered. Big holes appear on the membrane surface and the surface microstructure has become very rough with apparent worn parts. The NIPS DMAc 0.3 mm membrane was the least damaged sample among the NIPS samples after the abrasion test. The top layer remained almost unchanged after the test, but some debris can be seen on the surface. However, in high magnification SEM images, it is clear that intensive cracks start to appear on the membrane surface after the test, which would change the pore size and ruin the selectivity of the membrane.

Example 3a—Preliminary Data for PES Membranes

According to the protocol described in Example 1, poly (ether sulfone) CCD membranes were prepared from a 20 wt % PES solution, which was cast at a thickness of 500 μm onto Al, and then unidirectionally cooled on a pre-cooled Al plate. The pure water flux of the membrane was determined to be 167±17 LMH bar$^{-1}$.

The membrane has very smaller pores, which are smaller than 18.6 nm and were not detectable with the porometer. Further work will be needed to determine the actual pore size and the structure of the PES membranes, and to optimise the parameters to improve flux Example 3b—Extended Data for PES Membranes Materials Commercial polyethersulfone (PES, Radel® A300, ρ=1.37 g/cm$^3$) was purchased from Ameco Performance, USA. DMSO was purchased from Sigma-Aldrich, UK. All the chemicals were used as received.

Membrane Preparation

PES/DMSO membranes with different thicknesses were prepared using combined solvent crystallisation and polymer diffusion (CCD) method described in Example 1. Different material combinations for the casting and cooling plates were chosen to achieve different cooling rates and hence to illustrate the effect of cooling conditions on membrane structure and performance. The different combinations employed in this work for cooling/casting plates were copper/copper, aluminium/aluminium, glass/aluminium and glass/glass. The copper plates were 3 mm thick, whereas the aluminium and glass plates were both 6 mm thick.

The dope solution used was 15 wt. % PES/DMSO solution. It was prepared by dissolving 150 g of PES resin in 850 g of DMSO solvent at room temperature. The solution was then left in the oven whose temperature was maintained at 80° C. to remove all the bubbles in the solution. The dope solution was then cast onto the casting plate with the desired thickness using a casting knife. After that, the casting plate was contacted with a cooling plate whose temperature was set and maintained to be −30° C. After the membrane was completely frozen, it was then immersed into iced water to leach out the solvent crystallites. The conditions of each membrane prepared are summarised in Table 5.

TABLE 5

Casting conditions for the preparation of flat sheet membranes

| Sample | Solvent | Casting Thickness | Casting Plate | Cooling Plate |
|---|---|---|---|---|
| Al/Al* 1.0 mm | DMSO | 1.0 mm | Aluminium | Aluminium at −30° C. |
| Al/Al 0.7 mm | DMSO | 0.7 mm | Aluminium | Aluminium at −30° C. |
| Al/Al 0.5 mm | DMSO | 0.5 mm | Aluminium | Aluminium at −30° C. |
| Al/Al 0.3 mm | DMSO | 0.3 mm | Aluminium | Aluminium at −30° C. |
| Cu/Cu 1.0 mm | DMSO | 1.0 mm | Copper | Copper at −30° C. |
| Glass/Al 1.0 mm | DMSO | 1.0 mm | Aluminium | Glass at −30° C. |
| Glass/Glass 1.0 mm | DMSO | 1.0 mm | Glass | Glass at −30° C. |

*Materials of the sequence cold plate/casting plate. Al stands for aluminium and Cu stands for copper.

Results

FIG. 23 summarises the SEM images of the cross-sectional overview of the 1 mm thick CCD PES membranes prepared by four sets of casting plate and cooling plate. It can be seen that in all cases, a thin separation layer is supported by numerous well-arranged micro-channels whose size gradually increases from the separation layer. The structures are very similar to the CCD PVDF membranes described in Example 2.

FIG. 24 gives detailed structure of the separating layer of the 1 mm thick CCD PES membranes. Generally speaking, smaller pores should be formed under faster cooling rates, which is in agreement with the CCD PVDF membranes described in Example 2. However, when the cooling rate is too fast, as shown in the Cu/Cu case, the polymer solution film at the cold end was cooled down so quickly that the polymer solution would be frozen almost instantly. Therefore, there was less time for polymer diffusion to take place and the DMSO crystals at the colder side would agglomerate to form bigger grains, resulting in bigger pores than the Al/Al case in the final membranes.

To test the filtration performance of the membrane samples, pure water fluxes and pore sizes of prepared CCD PES membranes were measured and the results are tabulated in Table 6. All membranes showed very high water permeation flux. It is evident that the water permeation results and mean flow pore sizes of CCD membranes concur with the structure as seen in FIG. 24. For instance, the CCD Glass/Glass PES membrane has the largest pore size of 664 nm and showed the highest flux of 11,930 LHM bar$^{-1}$, and the Al/Al PES membrane has the smallest pore size of 28 nm and showed the lowest water flux of 2,286 LHM bar$^{-1}$.

TABLE 6

Permeation characteristics of 1 mm thick CCD PES membranes

| Membrane Material Pure PES | Membrane Type/Ref. CCD membranes $^a$ | PWF (LMH bar$^{-1}$) | MFP Size (nm) |
|---|---|---|---|
| | Glass/Glass 1.0 mm | 11,930 ± 199 | 664 ± 67 |
| | Glass/Al 1.0 mm | 6,328 ± 300 | 121 ± 17 |
| | Al/Al 1.0 mm | 2,286 ± 29 | 28 ± 1 |
| | Cu/Cu 1.0 mm | 5,813 ± 409 | 87 ± 2 |

$^a$ Sample names are ended with casting thickness; pore sizes were determined by the gas-liquid displacement method.

The effect of varying casting thickness on the structure and performance of the prepared CCD Al/Al PES membranes was also investigated. Table 7 shows the pure water fluxes and mean flow pore sizes of membranes prepared with various casting thickness. It can be seen clearly that as the casting thickness was decreased from 1.0 to 0.3 mm, the water flux reduced from approximately 2,286 to 1,619 LMH bar$^{-1}$. The pore size also decreased when casting thickness decreased, especially for casting thickness of 0.5 and 0.3 mm whose pore sizes were so small that could not be tested using the porometer. This trend is again in agreement with the trend of the CCD Al/Al PVDF membranes described in Example 2.

TABLE 7

Pure water fluxes and mean flow pore sizes of CCD Al/Al membranes prepared with various casting thickness

| Casting Thickness (mm) | PWF (LMH bar$^{-1}$) | MFP Size (nm) |
|---|---|---|
| 1.0 | 2,286 ± 29 | 29 ± 1 |
| 0.7 | 1,563 ± 174 | 23 ± 2 |
| 0.5 | 1,708 ± 33 | <18.6 |
| 0.3 | 1,619 ± 52 | <18.6 |

While specific embodiments of the invention have been described herein for the purpose of reference and illustration, various modifications will be apparent to a person skilled in the art without departing from the scope of the invention as defined by the appended claims.

REFERENCES

1. G.-d. Kang, Y.-m. Cao, Application and modification of PVDF (PVDF) membranes—A review. *J. Membr. Sci.* 463, 145-165 (2014).

2. F. Liu, N. A. Hashim, Y. Liu, M. R. M. Abed, K. Li, Progress in the production and modification of PVDF membranes. *J. Membr. Sci.* 375, 1-27 (2011).
3. G. R. Guillen, Y. Pan, M. Li, E. M. V. Hoek, Preparation and Characterization of Membranes Formed by Nonsolvent Induced Phase Separation: A Review. *Industrial & Engineering Chemistry Research* 50, 3798-3817 (2011).
4. M. Gu, J. Zhang, X. Wang, H. Tao, L. Ge, Formation of PVDF (PVDF) membranes via thermally induced phase separation. *Desalination* 192, 160-167 (2006).
5. D. R. Lloyd, S. S. Kim, K. E. Kinzer, Microporous membrane formation via thermally-induced phase separation. II. Liquid—liquid phase separation. *J. Membr. Sci.* 64, 1-11 (1991).
6. D. R. Lloyd, K. E. Kinzer, H. S. Tseng, Microporous membrane formation via thermally induced phase separation. I. Solid-liquid phase separation. *J. Membr. Sci.* 52, 239-261 (1990).
7. M. Lee, B. Wang, Z. Wu, K. Li, Formation of microchannels in ceramic membranes—Spatial structure, simulation, and potential use in water treatment. *J. Membr. Sci.* 483, 1-14 (2015).
8. L. Qian, H. Zhang, Controlled freezing and freeze drying: a versatile route for porous and micro-/nano-structured materials. *Journal of Chemical Technology & Biotechnology* 86, 172-184 (2011).
9. E. Munch et al., Tough, Bio-Inspired Hybrid Materials. *Science* 322, 1516-1520 2008).
10. S. Deville, E. Saiz, R. K. Nalla, A. P. Tomsia, Freezing as a Path to Build Complex Composites. *Science* 311, 515-518 (2006).
11. C. Mu, Y. Su, M. Sun, W. Chen, Z. Jiang, Fabrication of microporous membranes by a feasible freeze method. *J. Membr. Sci.* 361, 15-21 (2010).
12. Y. Su, Y. Liang, C. Mu, Z. Jiang, Improved Performance of PVDF Microfiltration Membranes Prepared by Freeze and Immersion Precipitation Coupling Method. *Industrial & Engineering Chemistry Research* 50, 10525-10532 (2011).
13. K. F. Kelton, Numerical-Model for Isothermal and Nonisothermal Crystallization of Liquids and Glasses. *J. Non-Cryst. Solids* 163, 283-296 (1993).
14. J.-W. Kim, K. Tazumi, R. Okaji, M. Ohshima, Honeycomb Monolith-Structured Silica with Highly Ordered, Three-Dimensionally Interconnected Macroporous Walls. *Chem. Mater.* 21, 3476-3478 (2009).
15. H. Zhang et al., Aligned two- and three-dimensional structures by directional freezing of polymers and nanoparticles. *Nat Mater* 4, 787-793 (2005).
16. Y. Sui, X. L. Gao, Z. N. Wang, C. J. Gao, Antifouling and antibacterial improvement of surface-functionalized PVDF membrane prepared via dihydroxyphenylalanine-initiated atom transfer radical graft polymerizations. *J. Membr. Sci.* 394, 107-119 (2012).
17. S. Rajabzadeh et al., Preparation of a PVDF hollow fiber blend membrane via thermally induced phase separation (TIPS) method using new synthesized zwitterionic copolymer. *Desalin Water Treat* 54, 2911-2919 (2015).
18. S. Nishigochi et al., Improvement of Antifouling Properties of Polyvinylidene Fluoride Hollow Fiber Membranes by Simple Dip Coating of Phosphorylcholine Copolymer via Hydrophobic Interactions. *Industrial & Engineering Chemistry Research* 53, 2491-2497 (2014).
19. S. Boributh, A. Chanachai, R. Jiraratananon, Modification of PVDF membrane by chitosan solution for reducing protein fouling. *J. Membr. Sci.* 342, 97-104 (2009).
20. M. G. Buonomenna, P. Macchi, M. Davoli, E. Drioli, PVDF membranes by phase inversion: the role the casting and coagulation conditions play in their morphology, crystalline structure and properties. *Eur. Polym. J.* 43, 1557-1572 (2007).
21. K. Gao, X. Hu, C. Dai, T. Yi, Crystal structures of electrospun PVDF membranes and its separator application for rechargeable lithium metal cells. *Materials Science and Engineering: B* 131, 100-105 (2006).
22. G. Laroche et al., Polyvinylidene fluoride (PVDF) as a biomaterial: From polymeric raw material to monofilament vascular suture. *Journal of Biomedical Materials Research* 29, 1525-1536 (1995).

The invention claimed is:

1. A process for the preparation of a flat sheet polymeric membrane having an average pore size of 0.01-10 µm, the process comprising the steps of:
   a) providing a polymeric dope solution comprising a polymer and a first solvent, wherein:
      i) the polymer is poly(vinylidene fluoride), poly(ethersulfone) or cellulose acetate and the first solvent is dimethyl sulfoxide, or
      ii) the polymer is cellulose acetate and the first solvent is acetic acid;
   b) casting the polymeric dope solution onto a substrate to form a cast polymeric film, the cast polymeric film having a first surface being in contact with the substrate, and a second surface disposed opposite the first surface;
   c) subjecting the cast polymeric film to a cooling means, the cooling means being provided at a temperature that is 5-120° C. below the melting temperature of the first solvent; and
   d) contacting the cooled cast polymeric film resulting from step c) with a second solvent, the second solvent being provided at a temperature below the melting point of the first solvent, and the second solvent being miscible with the first solvent;
   wherein during step c) only one of the first and second surfaces of the cast polymeric film is subjected to the cooling means, and
   wherein step d) removes the first solvent in a frozen state from the cast polymeric film.

2. The process of claim 1, wherein the polymer is poly(vinylidene fluoride) or poly(ethersulfone) and the first solvent is dimethyl sulfoxide.

3. The process of claim 1, wherein the polymer is poly(vinylidene fluoride) the first solvent is dimethyl sulfoxide.

4. The process of claim 1, wherein the dope polymeric solution comprises 10-30 wt % of the polymer.

5. The process of claim 1, wherein step b) comprises casting the polymeric dope solution onto a substrate to form a cast polymeric film having an average thickness of 0.05-2 mm.

6. The process of claim 1, wherein the cooling means is provided at a temperature that is 15-100° C. below the melting temperature of the first solvent.

7. The process of claim 1, wherein step c) comprises subjecting the first surface of the cast polymeric film to the cooling means.

8. The process of claim 1, wherein the substrate is sheet-like, having a first surface being in contact with the cast polymeric film, and a second surface disposed opposite the first surface.

9. The process of claim 8, wherein step c) comprises subjecting the second surface of the substrate to the cooling means.

10. The process of claim 1, wherein the substrate is glass or is metalli.

11. The process of claim 1, wherein the substrate has an average thickness of 2-15 mm.

12. The process of claim 1, wherein the cooling means is a sheet-like structure.

13. The process of claim 1, wherein the polymeric dope solution further comprises at least one dopant suitable for increasing the hydrophilicity of the membrane.

14. The process of claim 13, wherein the weight ratio of polymer to dopant within the polymeric dope solution is 2:1 to 8:1.

15. The process of claim 1, wherein:
i) the flat sheet polymeric membrane has an average pore size of 0.01-1.5 µm;
ii) the cooling means in step c) is a sheet-like structure or a liquid, and is provided at a temperature that is 40-80° C. below the melting temperature of the first solvent; and
iii) step c) comprises subjecting only the first surface of the cast polymeric film to the cooling means by applying the cooling means to the second surface of the substrate.

16. The process of claim 3, wherein:
i) the flat sheet polymeric membrane has an average pore size of 0.01-1.5 µm;
ii) in step b), the substrate has a thickness of 2-20 mm and the polymeric dope solution is cast onto the substrate to form a cast polymeric film having a thickness of 0.05-2 mm;
iii) the cooling means in step c) is a plate formed from a metal or glass, and is provided at a temperature that is 40-80° C. below the melting temperature of the first solvent; and
iv) step c) comprises subjecting only the first surface of the cast polymeric film to the cooling means by applying the cooling means to the second surface of the substrate.

17. The process of claim 1, wherein the second solvent is water.

18. The process of claim 1, wherein the cooling means is provided at a temperature of −18 to −50° C.

19. The process of claim 13, wherein the at least one dopant is poly(ethylene glycol).

* * * * *